US009871760B2

(12) United States Patent
Torgersrud

(10) Patent No.: US 9,871,760 B2
(45) Date of Patent: Jan. 16, 2018

(54) MESSAGE TRANSMISSION SCHEME IN A CONTROLLED FACILITY

(71) Applicant: Telmate LLC, San Francisco, CA (US)

(72) Inventor: Richard Torgersrud, San Francisco, CA (US)

(73) Assignee: Intelmate LLC, San Francisco, CA (US)

( * ) Notice: Subject to any disclaimer, the term of this patent is extended or adjusted under 35 U.S.C. 154(b) by 620 days.

(21) Appl. No.: 13/843,968

(22) Filed: Mar. 15, 2013

(65) Prior Publication Data

US 2014/0280631 A1    Sep. 18, 2014

(51) Int. Cl.
G06F 15/16    (2006.01)
H04L 12/58    (2006.01)

(52) U.S. Cl.
CPC .............. *H04L 51/34* (2013.01); *H04L 51/18* (2013.01)

(58) Field of Classification Search
CPC ........................... H04L 12/581; H04L 41/026
USPC ........................................................ 709/206
See application file for complete search history.

(56) References Cited

U.S. PATENT DOCUMENTS

| 8,458,732 | B2* | 6/2013 | Hanna et al. ............... 719/328 |
| 2007/0043823 | A1* | 2/2007 | George et al. ............... 709/207 |
| 2008/0040781 | A1* | 2/2008 | Keiser ................. H04L 12/5835 726/5 |
| 2008/0052203 | A1* | 2/2008 | Beyer ................. G06Q 10/087 705/28 |
| 2011/0010425 | A1* | 1/2011 | Bernatz ............... G06Q 10/107 709/206 |
| 2011/0282951 | A1* | 11/2011 | Akhtar ................ G06F 19/3425 709/206 |
| 2012/0262271 | A1* | 10/2012 | Torgersrud .............. G06F 21/32 340/5.53 |
| 2013/0198296 | A1* | 8/2013 | Roy ..................... G06Q 10/107 709/206 |

\* cited by examiner

*Primary Examiner* — Suraj Joshi
*Assistant Examiner* — Jaren M Means
(74) *Attorney, Agent, or Firm* — Osha Liang LLP

(57) ABSTRACT

A method for message transmission in a controlled facility includes receiving a request to transmit a message from a superfriend in a controlled facility. The superfriend includes an administrative privilege and a removal protection. The method further includes receiving, for the message from a superfriend network list of the superfriend, a selection contacts confined in the controlled facility, sending, via an electronic network, the message to each of the contacts in the controlled facility, and presenting the message to each of the contacts in the controlled facility. For each contact, the method further includes calculating audit information capturing the presenting of the message, and transmitting an acknowledgement of receipt of the message to the superfriend.

20 Claims, 12 Drawing Sheets

MESSAGE TRANSMISSION SCHEME IN A CONTROLLED FACILITY

CROSS-REFERENCE TO RELATED APPLICATIONS

This application is related to U.S. patent application Ser. No. 13/438,940 filed on Apr. 4, 2012, entitled "Secure Social Network." U.S. patent application Ser. No. 13/438,940 is incorporated by reference in its entirety.

BACKGROUND

Controlled facilities, such as a jail, prison, secure detention environments, detention facility, secured hospital, or addiction treatment facility, house large populations of individuals in confinement, which presents unique administrative challenges. In such detention environments, detained individuals, such as prisoners, offenders, convicts, military personnel, patients, government cleared personnel, or other detainees, frequently desire to communicate with individuals outside the detention environment such as friends or family members.

SUMMARY

In general, in one aspect, embodiments relate to a method for message transmission in a controlled facility. The method includes receiving a request to transmit a message from a superfriend in a controlled facility. The superfriend includes an administrative privilege and a removal protection. The method further includes receiving, for the message from a superfriend network list of the superfriend, a selection contacts confined in the controlled facility, sending, via an electronic network, the message to each of the contacts in the controlled facility, and presenting the message to each of the contacts in the controlled facility. For each contact, the method further includes calculating audit information capturing the presenting of the message, and transmitting an acknowledgement of receipt of the message to the superfriend.

In general, in one aspect, embodiments relate to a system for message transmission in a controlled facility. The system includes a computer processor, a database server, and a network application. The database server includes a superfriend account for a superfriend. The superfriend account stores a superfriend network list, where the superfriend includes an administrative privilege and a removal protection. The network application executes on the computer processor and includes a communication module and an audit module. The communication module is configured to receive a request to transmit a message from the superfriend in a controlled facility, receive, for the message from the superfriend network list of the superfriend, a selection of contacts confined in the controlled facility, send, via an electronic network, the message to each of the contacts in the controlled facility, and present the message to each of the contacts in the controlled facility. For each contact, the audit module is configured to calculate audit information capturing the presenting of the message, and transmit an acknowledgement of receipt of the message to the superfriend.

In general, in one aspect, embodiments relate to a non-transitory computer readable medium for message transmission in a controlled facility. The non-transitory computer readable medium includes computer readable program code for receiving a request to transmit a message from a superfriend in a controlled facility. The superfriend includes an administrative privilege and a removal protection. The computer readable program code is further for receiving, for the message from a superfriend network list of the superfriend, a selection contacts confined in the controlled facility, sending, via an electronic network, the message to each of the contacts in the controlled facility, and presenting the message to each of the contacts in the controlled facility. For each contact, The computer readable program code is further for calculating audit information capturing the presenting of the message, and transmitting an acknowledgement of receipt of the message to the superfriend.

Other aspects of the invention will be apparent from the following description and the appended claims.

DETAILED DESCRIPTION

Figure 1:
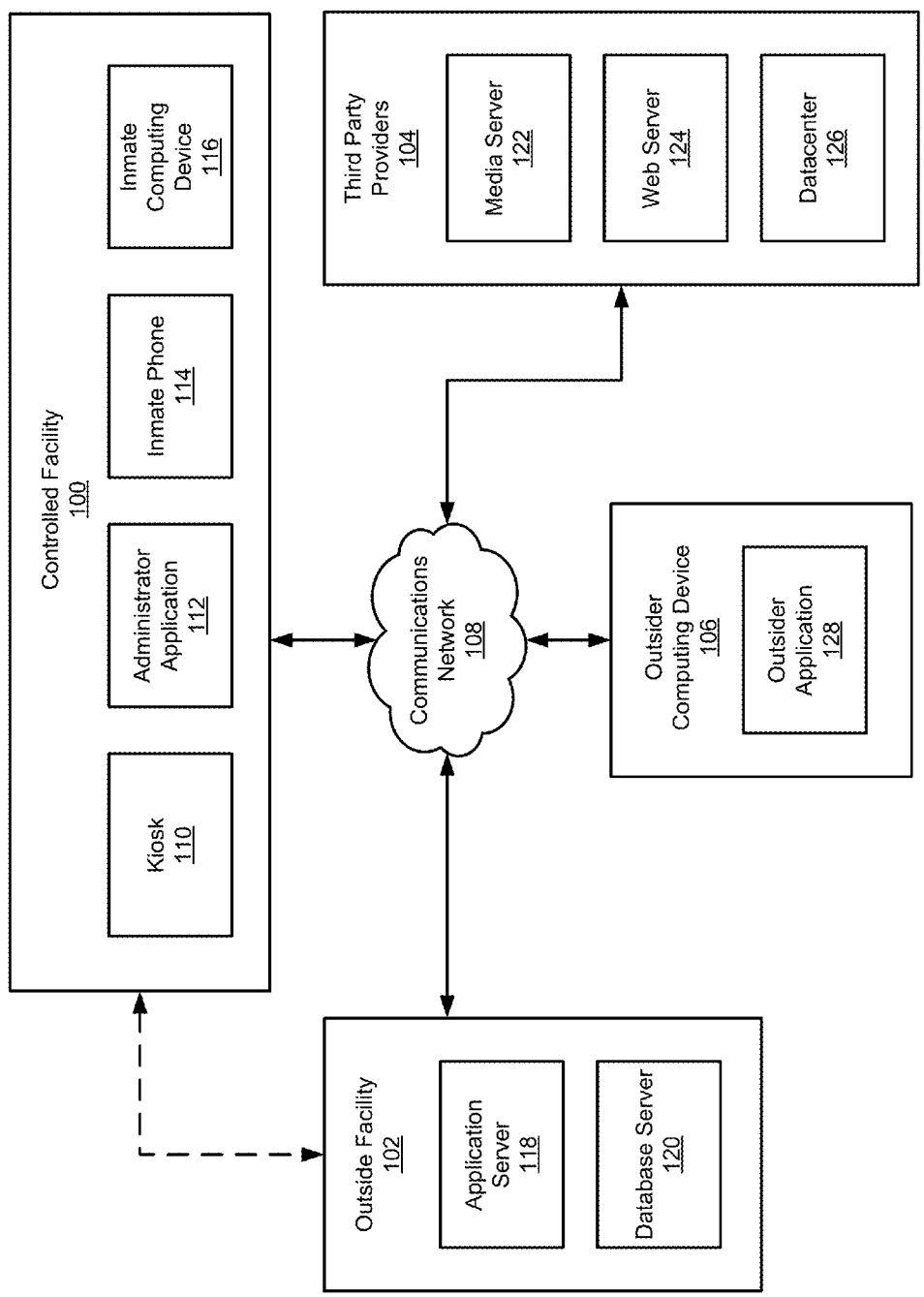
FIGS. 1-7 show schematic diagrams of a system in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for distributing messages in a controlled facility, and providing for the forced association of inmates with certain facility staff or communications system operator staff in a secure social network. Specifically, one or more embodiments transmit messages between a superfriend and inmates. A superfriend is a staff member of or other person affiliated with the controlled facility, or an employee of the communications system operator with an administrative privilege and removal protection. Removal protection prevents the individual from be removed from the contact. The superfriend sends a message to contacts in the controlled facility. The message is presented to the contact and audit information is calculated from the presentation of the message. Further, the administrator of the controlled facility is notified of the receipt of the message. The audit information may be transmitted to an investigator for investigative purposes.

Embodiments of the invention may include interactions with a secure social network. In one or more embodiments of the invention, a secure social network is a network application that facilitates and secures the exchange or transmission of information between two or more parties in which at least one of those parties is subject to special security or law enforcement restrictions or otherwise resides in, or is subject to the controls of a controlled facility. Exchanged or transmitted information may be member generated, such as a photo or a video message, or it may be member-curated, such as a news headline, a famous quote, or a sports score.

FIG. 1 shows a diagram of a system in accordance with one or more embodiments of the invention. As shown in FIG. 1, the system includes a controlled facility (100), an outside facility (102), third party providers (104), and an outsider computing device (106) each communicatively coupled to a communications network (108). The controlled facility (100) may include, but is not limited to, a kiosk (110), an administrator application (112), an inmate phone (114), and an inmate computing device (116). The outside facility (102) may include an application server (118) and a database server (120). The third party providers (104) may include a media server (122), a web server (124), and a datacenter (126). The outsider computing device (106) may include an outsider application (128).

In one or more embodiments of the invention, a controlled facility (100) is an access-restricted location. Examples of controlled facilities (e.g., controlled facility (100)) include, but are not limited to, detention environments (e.g., jails, prisons, etc.), immigration detention centers, military centers, government secure sites, law enforcement holding structures, secure business complexes, and psychiatric hospitals.

In one or more embodiments of the invention, an inmate is a person within a controlled facility (100) who is subject to one or more restrictions, primarily to his or her freedom or rights. Examples of inmates include, but are not limited to, prisoners, wards of the state, parolees, employees working in a secure business complex, temporary or long-term internees, patients, military personnel, uncharged suspects, and refugees. Inmate restrictions may be part of a court-imposed sentence on an inmate, while others may be specific to the controlled facility (100) in which the inmate resides. Restrictions may include limitations on an inmate's physical movement (i.e., physical restrictions) and limitations on the inmate's ability to communicate (i.e., communication restrictions). Communication restrictions include inmate use restrictions, inmate target restrictions, and device use restrictions.

In one or more embodiments of the invention, inmate use restrictions are limitations on an inmate's general ability to communicate with visitors and/or outsiders. Inmate use restrictions may include, for example, periods of time in which an inmate is not allowed to communicate with outsiders or visitors (e.g., between 10 PM and 8 AM, during an imposed one-week punitive period, etc.) and limitations based on lack of funds (e.g., insufficient commissary account balance to initiate a communication).

In one or more embodiments of the invention, inmate target restrictions are limitations on the target or source of a communication with the inmate. Inmate target restrictions may be specific outsiders or visitors with whom the inmate is not allowed to communicate (e.g., the victim of a crime perpetrated by the inmate, etc.). Inmate target restrictions may also include types of people with whom the inmate is not allowed contact (e.g., outsiders who are ex-cons, minors under the age of 18, etc.).

In one or more embodiments of the invention, device use restrictions are restrictions based on the condition or state of the communication device used by the inmate. Device use restrictions include, for example, limitations based on the location of the inmate's mobile device, limitations imposed based on a determination that the device has been tampered with, etc.

In one or more embodiments of the invention, an outsider is a person outside the controlled facility (100) who may be the source or target of a communication with an inmate. An outsider who enters the controlled facility (100) for the purpose of communicating with an inmate is referred to as a visitor.

In one or more embodiments of the invention, the kiosk (110) is a computing system with functionality to facilitate communication between an inmate and a visitor or outsider. Such communication facilitation may include creating a system identity data item or secure social networking account, adding or importing contact information for outsiders with whom the inmate wishes to communicate, uploading media (e.g., photos, videos, audio, and text) to, or viewing media from, a secure social network, sending or receiving messages or other media, acting as an endpoint for voice and video communication between an inmate and a visitor or outsider, scheduling a communication, and managing a commissary or communications account. Further detail about kiosks (e.g., kiosk (110)) is provided in FIG. 2, FIG. 5A, FIG. 5B, and FIG. 6.

In one or more embodiments of the invention, the administrator application (112) is a process or group of processes executing on a computing system with functionality to enable an administrator to create, remove, and/or enforce one or more restrictions on an inmate. In one or more embodiments of the invention, an administrator is a person associated with the controlled facility charged with enforcing one or more restrictions. Examples of administrators include, but are not limited to, prison guards, orderlies, wardens, prison staff, jailers, information technology technicians, system administrators, and law enforcement agents. In one or more embodiments of the invention, an administrator is a person associated with the software developer/operator, whose use of Superfriend privileges is for the purpose of communicating system events, notices, and/or promotions to the users of the system. Using the administrator application, an administrator may retrieve or alter the identity data item and/or secure social network account of an inmate, visitor, or outsider. Further detail about the administrator application (112) is provided in FIG. 2.

In one or more embodiments of the invention, the inmate phone (114) is a device with functionality to send and receive audio communications between an inmate and an outsider or visitor. In one or more embodiments of the invention, the inmate phone (114) is a stationary (i.e., non-mobile) device. Further, a single inmate phone (114) may be used by more than one inmate. Further detail about the inmate phone (114) is provided in FIG. 2.

In one or more embodiments of the invention, the inmate computing device (116) is a computing device with functionality to enable an inmate to communicate with a visitor or outsider. Specifically, the inmate computing device (116) may be used to send or receive text messages and/or initiate or receive voice or video calls. In one or more embodiments of the invention, the inmate computing device (116) also enables an inmate to access a secure social network. Specifically, the inmate computing device (116) may be used to upload media to, or view media from, a secure social network account of the inmate or another secure social network member. In one or more embodiments of the invention, the inmate computing device (116) is a mobile computing device (e.g., a smartphone, a laptop, a tablet, etc.). Further detail about the inmate computing device (116) is provided in FIG. 2 and FIG. 6.

In one or more embodiments of the invention, the elements within the controlled facility (100) are communicatively coupled to the communications network (108). In one or more embodiments of the invention, the communications network (108) is a collection of computing systems and other hardware interconnected by communication channels. The communications network (108) may include networks that are exclusively or primarily used for a single type of communication, such as a telephone network (e.g., Public Switched Telephone Network (PSTN), Plain Old Telephone System (POTS)), and/or networks used for a wide array of communication types, such as the Internet through Voice over IP (VoIP). Communication channels used by the communications network (108) may include, for example, telephone lines, networking cables, wireless signals, radio waves, etc. Fees charged and payments received by the provider(s) of the communications network (108) may involve multiple parties, including a service provider of the outside facility (102), the management of the controlled facility (100), and provider(s) of the communications network (108). In one or more embodiments of the invention, fees may be split between multiple parties based on the terms of underlying agreements or contracts between the parties. Further, rebates, reimbursements, and/or refunds may be afforded to and paid to the management of the controlled facility (100) based on the terms of underlying agreements or contracts between the parties. For example, the management of the controlled facility (100) may receive a rebate from the service provider of the services provided to inmates based on such factors as the volume of use, the dollar amount, and/or the frequency of use.

In one or more embodiments of the invention, the outside facility (102) is a group of computing systems located outside of the controlled facility (100). Specifically, the outside facility (102) may house system elements with functionality to facilitate communication between inmates and outsiders, access communication data between inmates and outsiders, and enforce one or more restrictions imposed on inmates and inmate communications. In one or more embodiments of the invention, the outside facility (102) is connected directly to the controlled facility (100) bypassing a generally accessible communications network (communications network (108)). One or more of the components within the outside facility (102) may alternatively be located within the controlled facility (100) or within the third party providers (104).

In one or more embodiments of the invention, the application server (118) is a computing system with functionality to authenticate an inmate, outsider, administrator, reviewer, or investigator for access to system functionality (e.g., initiating voice or video calls, sending text messages, etc.) or data stored on the database server (120) (e.g., inmate identities, communications between inmates and outsiders, etc.). The application server may authenticate inmates, outsiders, administrators, reviewers, and/or investigators using passwords, biometric data, digital access codes, and/or physical access devices. Further detail about the application server (118) is provided in FIG. 3.

In one or more embodiments of the invention, the database server (120) is a computing system with functionality to store identities used to authenticate inmates, outsiders, administrators, reviewers, and/or investigators. Such identities may include verified data used to compare to verification data provided by the inmate, outsider, administrator, reviewer, or investigator to authenticate the inmate, outsider, administrator, reviewer, or investigator.

In one or more embodiments of the invention, the database server (120) also stores communication data about communications between an inmate and an outsider or visitor. Such communication data may include, for example, a recording of a video call, the length of a voice call, the frequency of video calls, sent and received text messages, etc. The database server (120) may also store media submitted to a secure social network before, during, and/or after the media has been reviewed. Further detail about the database server (120) is provided in FIG. 3.

In one or more embodiments of the invention, the third party providers (104) are computing systems that provide network application and data storage services (i.e., cloud computing services). Third party providers (104) may include service providers used directly by inmates and outsiders, such as photo sharing services, general social networking sites, and digital music retailers. Third party providers (104) may include service providers employed by administrators and for use by inmates and outsiders, such as audio and video streaming applications, conferencing applications, and secure social network media storage. One or more of the components within the third party providers (104) may alternatively be located within the controlled facility (100) or the outside facility (102).

In one or more embodiments of the invention, the media server (122) is a computing system or group of computing system with functionality to provide network application services to facilitate communication between an inmate and an outsider, and to facilitate access to a secure social network. Such services include, but are not limited to, VoIP services, video conferencing services, and media streaming services.

In one or more embodiments of the invention, the web server (124) is a computing system or group of computing system with functionality to provide an interface to access and interact with webpages and other network application services. In one or more embodiments of the invention, the web server (124) is a type of media server (122).

In one or more embodiments of the invention, the datacenter (126) is a computing system or group of computing system with functionality to provide an interface to access and interact with data stored on one or more data servers (not shown). In one or more embodiments of the invention, the datacenter (126) is a type of media server (122).

In one or more embodiments of the invention, the outsider computing device (106) is a computing device with functionality to execute the outsider application (128). In one or more embodiments of the invention, the outsider computing device (106) is a mobile computing device (e.g., a smartphone, a laptop, a tablet, etc.). Further detail about the outsider computing device (106) is provided in FIG. 6.

In one or more embodiments of the invention, the outsider application (128) is a process or group of processes (in software, firmware, hardware, or combination thereof) with functionality to enable communication between an outsider and an inmate. Specifically, the outsider application (128) may be used to send or receive text messages and/or initiate or receive voice or video calls. In one or more embodiments of the invention, the outsider application (128) also enables an outsider to access a secure social network. Specifically, the outsider application (128) may be used to upload media to, or view media from, a secure social network account of the outsider, an inmate, other secure social network member.

Figure 2:
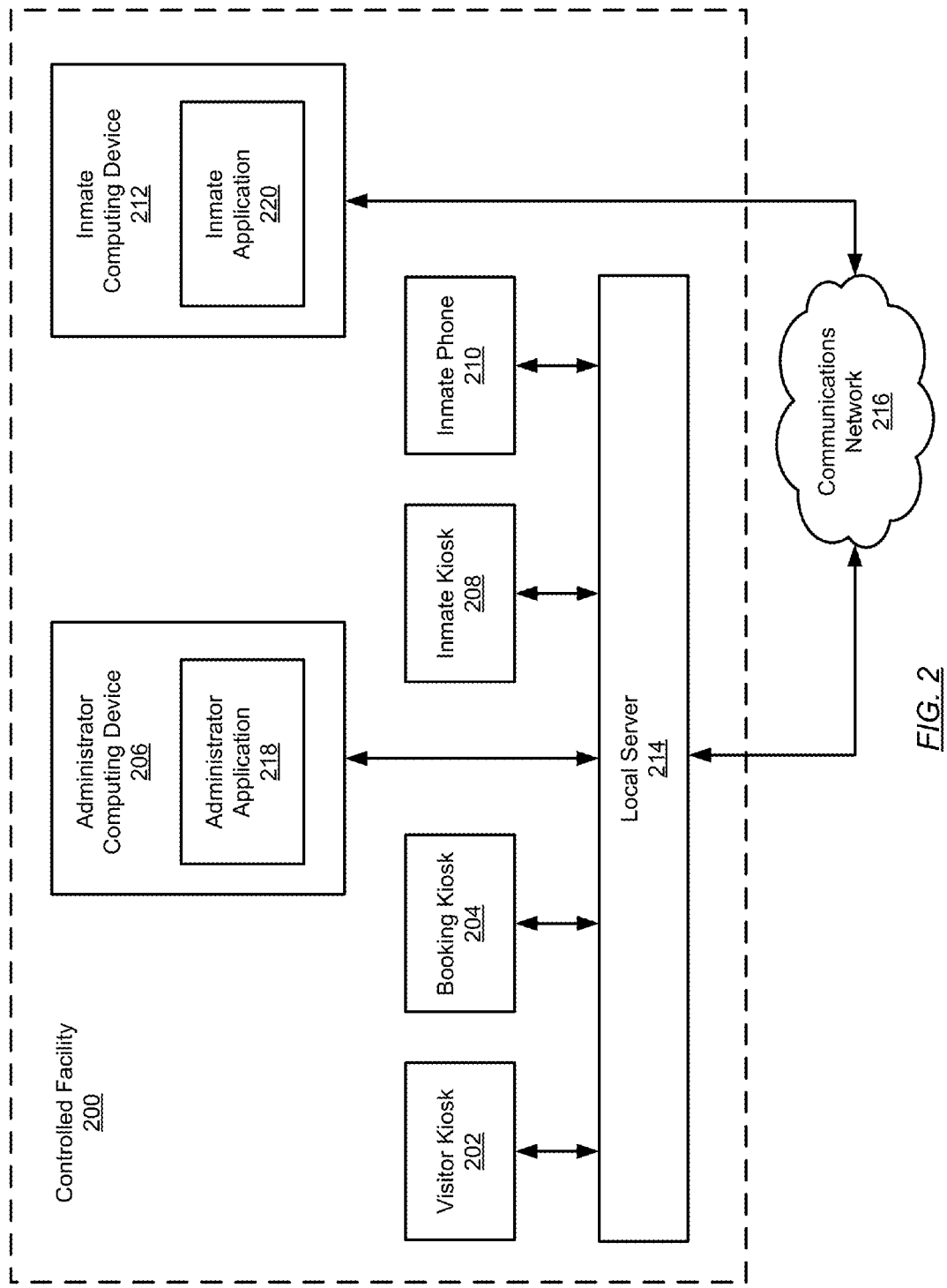

FIG. 2 shows a controlled facility in accordance with one or more embodiments of the invention. As shown in FIG. 2, the controlled facility (200) may include a visitor kiosk (202), a booking kiosk (204), an administrator computing device (206), an inmate kiosk (208), an inmate phone (210), an inmate computing device (212), and a local server (214). The inmate computing device (212) and the local server (214) are communicatively coupled to the communications network (216). The administrator computing device (206)

includes an administrator application (218). The inmate computing device (212) includes an inmate application (220).

In one or more embodiments of the invention, the visitor kiosk (202) is a computing system with functionality to facilitate communication between an inmate and a visitor. Specifically, the visitor kiosk (202) may be a combination of computing hardware and software used by a visitor to make and receive voice and video calls to/from an inmate residing in the same controlled facility (200) or another controlled facility (not shown). The visitor kiosk (202) may also be used to schedule a voice or video call with an inmate for a future date. Further, the visitor kiosk (202) may also include the functionality to exchange media (e.g., photos, videos, and audio) with an inmate residing in the controlled facility (200). The visitor kiosk (202) may include functionality to generate such media, such as a camera, microphone, keyboard, and software to record or otherwise create media to send to an inmate. Such media may be subject to review before being delivered.

In one or more embodiments of the invention, a visitor wanting to use a visitor kiosk (202) may be required to participate in an authentication process to verify the identity of the visitor. The authentication process may include creating an identity data item and verified data for storage and later comparison. The verified data used for authentication may be a username and password combination and/or biometric information about the visitor.

In one or more embodiments of the invention, the visitor kiosk (202) includes functionality to access a secure social network. Specifically, the visitor kiosk (202) may be used by a visitor to create and manage a secure social network account. The visitor kiosk (202) may also be used by a visitor to upload digital media to the visitor's secure social network account or the account of another secure social network member. The visitor kiosk (202) may further be used to view digital media uploaded to the visitor's social network account or the account of another secure social network member.

In one or more embodiments of the invention, the visitor kiosk (202) includes functionality to manage a commissary account for one or more inmates. Specifically, a visitor may use a visitor kiosk (202) to add money to the commissary account of an inmate in the controlled facility (200), view a transaction history of the commissary account, transfer funds between commissary accounts, and/or remove funds from a commissary account. Further detail about the visitor kiosk (202) is provided in FIG. 5A and FIG. 5B.

In one or more embodiments of the invention, the booking kiosk (204) is a computing system with functionality to aid administrators in admitting an inmate into a controlled facility (e.g., controlled facility (200)). Specifically, the booking kiosk (204) may include functionality to create or update an inmate identity data item. Specifically, the booking kiosk (204) may be used to obtain verified data (e.g., passwords, biometric data, etc.) and save the verification data in one or more identity data items for the inmate. The verified data may then be used to authenticate the inmate (e.g., to access the communications network (216), etc.). In one or more embodiments of the invention, the booking kiosk may also be used to associate one or more restrictions with the inmate via the inmate's identity data item.

In one or more embodiments of the invention, the booking kiosk (204) includes functionality to input contact information for visitors, outsiders, administrators, or other inmates with whom the inmate wants to communicate. Such contact information may then be associated with the inmate's identity data item, and may be used to initiate a voice or video call, or otherwise transmit media to visitors, outsiders, or other inmates. Further, In one or more embodiments of the invention, the contact information may be retrieved from an inmate's mobile computing device (e.g., cell phone, smart phone, etc.) or a local or remote data storage device (e.g., a flash drive, a webmail account, etc.). The contact information may be retrieved using a wired or wireless connection between the booking kiosk and the inmate's mobile computing device and/or the data storage device. The contact information may be subject to review before the inmate is permitted to contact the visitor, outsider, administrator, or other inmate.

In one or more embodiments of the invention, the booking kiosk (204) includes functionality to prepare a mobile computing device for use by the inmate within the controlled facility (200). Specifically, a controlled facility (200) may allow inmates the use of computing devices while in or subject to the controlled facility (200). However, use of such inmate computing devices may require that the computing device is instrumented with software restricting the use of the inmate computing device. The booking kiosk (204) may be used to instrument the inmate computing device as required. Further detail about the booking kiosk (204) is provided in FIG. 5A and FIG. 5B.

In one or more embodiments of the invention, the administrator computing device (206) is a computing system or group of computing systems with functionality to execute the administrator application (218). In one or more embodiments of the invention, the administrator application (218) is a process or group of process with functionality to provide access to communications between inmates at the controlled facility (200) and visitors, outsiders, administrators, and other inmates. The administrator application (218) may also be used to monitor current voice or video calls between an inmate and a visitor, outsider, administrator, or other inmate.

In one or more embodiments of the invention, the administrator application (218) is used to manage an identity data item associated with an inmate. Such management may include altering the restrictions (device use restrictions, inmate use restrictions, and inmate target restrictions) applicable to the inmate. In one or more embodiments of the invention, the administrator application (218) is used to access the secure social network account of an inmate, visitor, or outsider. In one or more embodiments of the invention, the administrator application (218) may provide heightened access (i.e., a level of access greater than that of the inmate, visitor, or outsider) to data stored in the secure social networking account.

In one or more embodiments of the invention, the inmate kiosk (208) is a computing system with functionality to facilitate communication between an inmate and a visitor or outsider. Specifically, the inmate kiosk (208) may be a combination of computing hardware and software used by an inmate to make and receive voice and video calls to/from a visitor, outsider, or another inmate residing in another controlled facility (not shown). The inmate kiosk (208) may also be used to schedule a voice or video call with a visitor at a future date. Initiating or scheduling a voice or video call may include determining whether the currently attempted call or the scheduled call are adverse to one or more restrictions (e.g., inmate use restrictions, device use restrictions, and/or inmate target restrictions). Further, the inmate kiosk (208) may also include the functionality to exchange media (e.g., photos, videos, and audio) with a visitor or outsider. The inmate kiosk (208) may include functionality to generate such media, such as a camera, microphone, keyboard, and software to record or otherwise create media to send to a visitor or outsider. Such media may be subject to review before being delivered.

In one or more embodiments of the invention, an inmate wanting to use an inmate kiosk (208) may be required to participate in an authentication process to verify the identity of the inmate. The authentication process may include providing verification data for comparison to verified data previously obtained from the inmate and stored in the inmate identity data item. The verified data may be a username and password combination and/or biometric information about the inmate.

In one or more embodiments of the invention, the inmate kiosk (208) includes functionality to access a secure social network. Specifically, the inmate kiosk (208) may be used by an inmate to manage a secure social network account. The inmate kiosk (208) may include functionality to generate such media, such as a camera, microphone, keyboard, and software to record or otherwise create media to send to a visitor or outsider. The inmate kiosk (208) may also be used by an inmate to upload digital media to the inmate's secure social network account or the account of another secure social network member. The inmate kiosk (208) may further be used to view digital media uploaded to the inmate's social network account or the account of another secure social network member. Uploaded media may be subject to review before posting.

In one or more embodiments of the invention, the inmate kiosk (208) includes functionality to manage a commissary account for the inmate. Specifically, an inmate may use an inmate kiosk (208) to view a transaction history of the commissary account and/or to apply commissary funds for goods and services consumed or enjoyed by the inmate. Further detail about the inmate kiosk (208) is provided in FIG. 5A and FIG. 5B.

In one or more embodiments of the invention, the inmate phone (210) is a device with functionality to send and receive audio communications between an inmate and an outsider or visitor. The inmate phone (210) may be implemented as handset connected to a telephone line. In one or more embodiments of the invention, all or part of the voice call may be conducted over a VoIP connection. In one or more embodiments of the invention, a single inmate phone (210) is utilized by multiple inmates.

In one or more embodiments of the invention, initiating or receiving a voice call using the inmate phone (210) requires a form of authentication (e.g., providing a password, personal identification number, or voice verification). In one or more embodiments of the invention, voice calls made using the inmate phone (210) are monitored by one or more administrators using the administrator computing device (206), and are recorded and stored in a data storage system within the controlled facility (200), within the outside facility (not shown), or within a third party provider (not shown). The inmate phone (210) may also be subject to device use restrictions limiting the ability to use the inmate phone (210) at certain times (e.g., between 9 PM and 8 AM) or under certain conditions (e.g., emergency lockdown).

In one or more embodiments of the invention, the identity of the visitor or outsider targeted by the inmate or attempting to contact the inmate using the inmate phone (210) is verified against inmate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In one or more embodiments of the invention, the inmate computing device (212) is a computing system configured to execute the inmate application (202). In one or more embodiments of the invention, each inmate computing device (212) is utilized exclusively by a single inmate. In one or more embodiments of the invention, access to the inmate application requires a form of initial authentication. This initial authentication may use verification data stored locally on the inmate computing device (212) (e.g., a code or combination used to unlock the phone, locally stored biometric data, etc.).

In one or more embodiments of the invention, accessing a communications network (e.g., communications network (216)) using the inmate application (220) may require further network-based authentication. This further authentication may use verification data stored external to the inmate computing device (212) but locally within the controlled facility (200), or remotely within the outside facility (not shown) or within a third party provider (not shown).

In one or more embodiments of the invention, an authenticated inmate may use the inmate application to initiate or receive voice or video calls, initiate or receive text or media messages, schedule a voice or video call, manage a commissary account, or post media to a secure social network. In one or more embodiments of the invention, voice and video calls made using the inmate computing device (212) are monitored by one or more administrators using the administrator computing device (206), and are recorded and stored in a data storage system within the controlled facility (200), within the outside facility (not shown), or within a third party provider (not shown).

In one or more embodiments of the invention, the identity of the visitor or outsider targeted by the inmate or attempting to contact the inmate using the inmate computing device (212) is verified against inmate target restrictions imposed on the inmate. Such restrictions may be associated with the inmate's identity data item and may be stored locally within the controlled facility (200), within the outside facility (not shown), or within a third party provider (not shown). The visitor or outsider identity may be verified by the local server (214) or by another server within the outside facility (not shown), or within a third party provider (not shown).

In one or more embodiments of the invention, the inmate computing system (212) and/or the inmate application (220) may limit access to the communications network (216) based on one or more restrictions (inmate use restrictions, inmate target restrictions, and device use restrictions). Further, the inmate computing system (212) and/or the inmate application (220) may gather data from input devices of the inmate computing system (212) to determine whether one or more restrictions apply. Such input devices may include, for example, a system clock, a global positioning system antenna, a wide area network antenna, etc.

In one or more embodiments of the invention, the local server (214) is a computer system or group of computers systems located within the controlled facility (200) that facility communication between inmates and visitors, outsiders, and/or other inmates. Specifically, the local server (214) may implement the software necessary to host voice and video calls between and among the visitor kiosk (202), the inmate kiosk (208), the inmate phone (210), and an outsider computing system (not shown). The local server (214) may also include functionality to enforce communication restrictions associated with the inmates using the inmate kiosk (208) or inmate phone (210). Alternatively, the local server (214) may merely provide access to other systems capable of hosting the communication software and data storage (e.g., located within an offsite facility or a third party provider). Further, in one or more embodiments of the invention, the local server (214) includes functionality to regulate inmate access to a secure social network.

Figure 3:
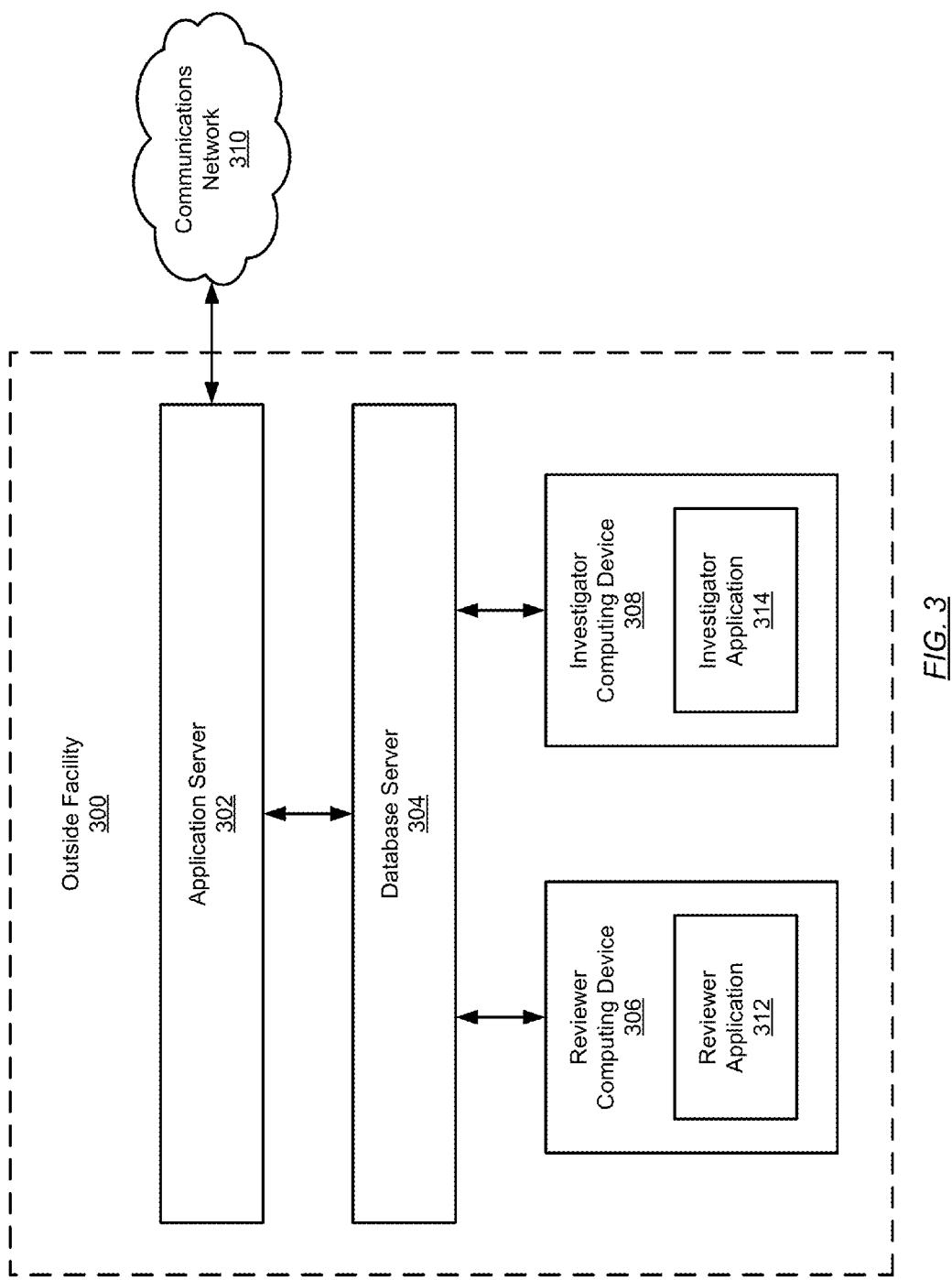

FIG. 3 shows an outside facility in accordance with one or more embodiments of the invention. As shown in FIG. 3, the outside facility (300) may include an application server (302), a database server (304), a reviewer computing system (306), and an investigator computing system (308). The application server (302) is communicatively coupled to the communications network (310). The reviewer computing device (306) may include a reviewer application (312), and the investigator computing device (308) may include an investigator application (314).

In one or more embodiments of the invention, the application server (302) is a computing system or group of computing systems configured to authenticate inmates, visitors, outsiders, administrators, reviewers, and/or investigators. Specifically, the application server (302) includes functionality to receive a request to authenticate an inmate, visitor, outsider, administrator, reviewer, and/or an investigator, retrieve verified data associated with the request, and compare the verified data to verification data submitted in the authentication request. In one or more embodiments of the invention, the application server provides access to identity data items and other data stored in the database server (304).

In one or more embodiments of the invention, the database server (304) is a computing system or group of computing system configured to store data about inmates, visitors, outsiders, administrators, reviewers, and/or investigators as well as communication data describing communications between and among inmates, visitors, outsiders, administrators, reviewers, and/or investigators. Data stored in the database server may include, but is not limited to, identity data items, verified data, approved communication media, communication media pending review In one or more embodiments of the invention, the reviewer computing device (306) is a computing system configured to execute the reviewer application (312). In one or more embodiments of the invention, a reviewer is a person charged with viewing a media item submitted by an inmate, visitor, outsider or administrator, and determining one or more attributes of the media item. Based on the determined attributes of the media item, the reviewer may then approve the media item for transmission to its target inmate, visitor, or outsider. Alternatively, the reviewer may reject the media item, conditionally approve the media item, or redact parts of the media item, thus preventing complete transmission to its target inmate, visitor, or outsider. In one or more embodiments of the invention, the reviewer application (312) include functionality to view media items, associate one or more attributes to the media item, and/or mark the media items as approved or rejected.

In one or more embodiments of the invention, the investigator computing device (308) is a computing system configured to execute the investigator application (314). In one or more embodiments of the invention, an investigator is a person gathering information about an inmate, visitor, or outsider generally for the purposes of law enforcement. The investigator application (314) includes functionality to provide access to data stored on the database server (304) for investigative purposes.

Figure 4:
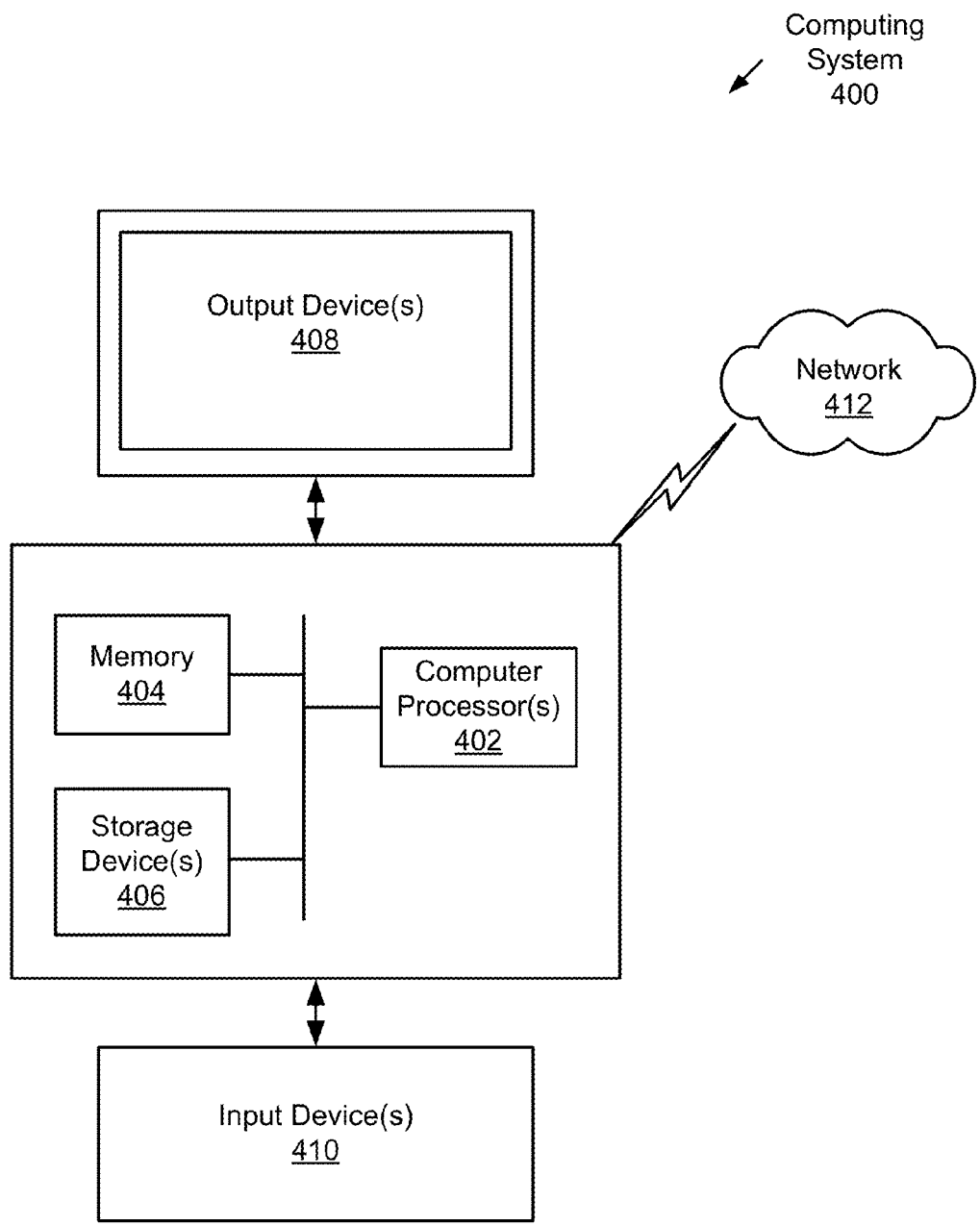

FIG. 4 shows a general computing system in accordance with one or more embodiments of the invention. As shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, camera, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (414). Further, embodiments of the invention may be implemented on a distributed system having a plurality of nodes, where each portion of the invention may be located on a different node within the distributed system. In one or more embodiments of the invention, the node corresponds to a distinct computing device. Alternatively, the node may correspond to a computer processor with associated physical memory. The node may alternatively correspond to a computer processor or micro-core of a computer processor with shared memory and/or resources.

Figure 5A:
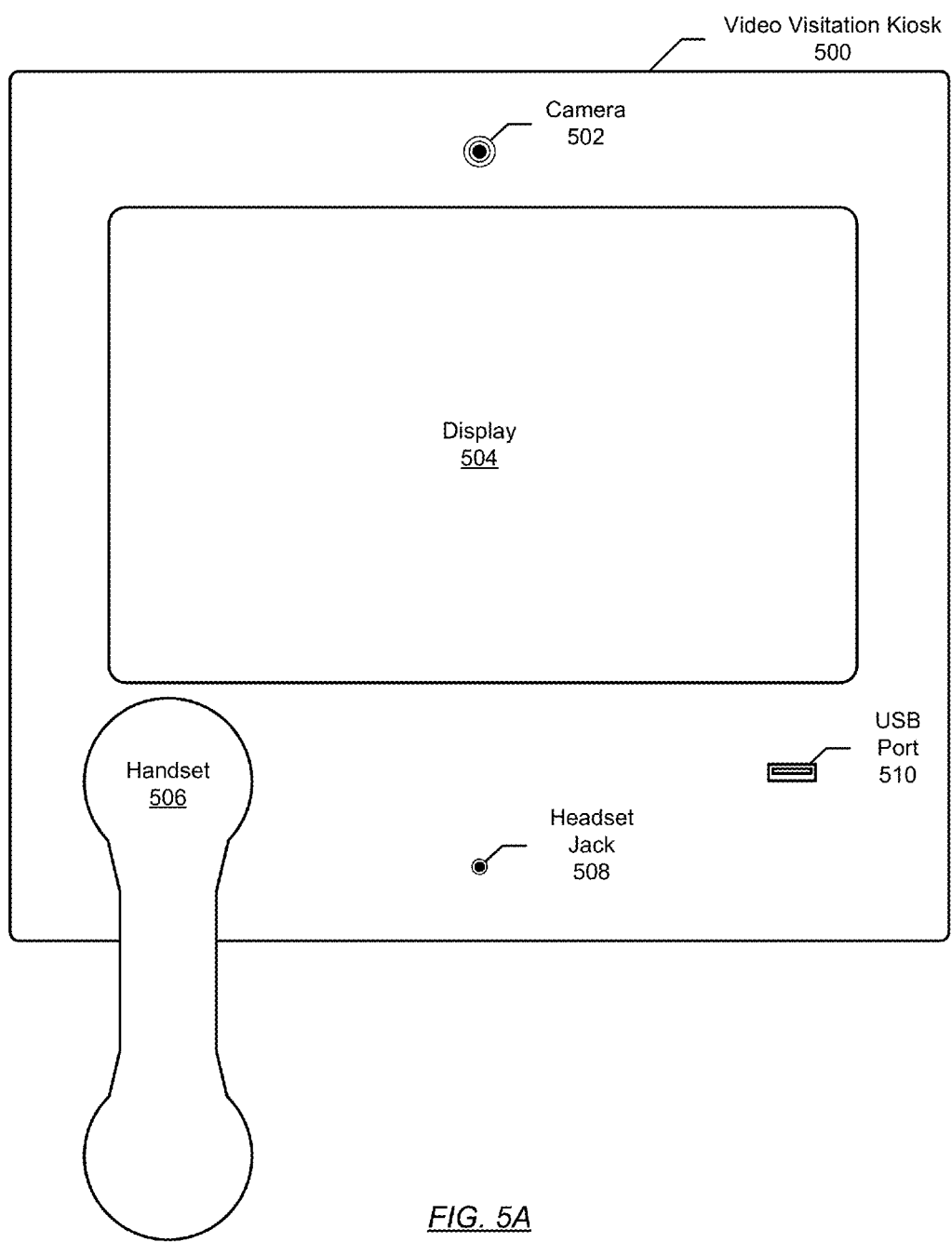

FIG. 5A shows a video visitation kiosk in accordance with one or more embodiments of the invention. Specifically, the video visitation kiosk (500) is a type of computing device as described in FIG. 4. As shown in FIG. 5A, the video visitation kiosk (500) includes a camera (502), a display (504), a handset (506), a headset jack (508), and a universal serial bus (USB) port (510).

Figure 5B:
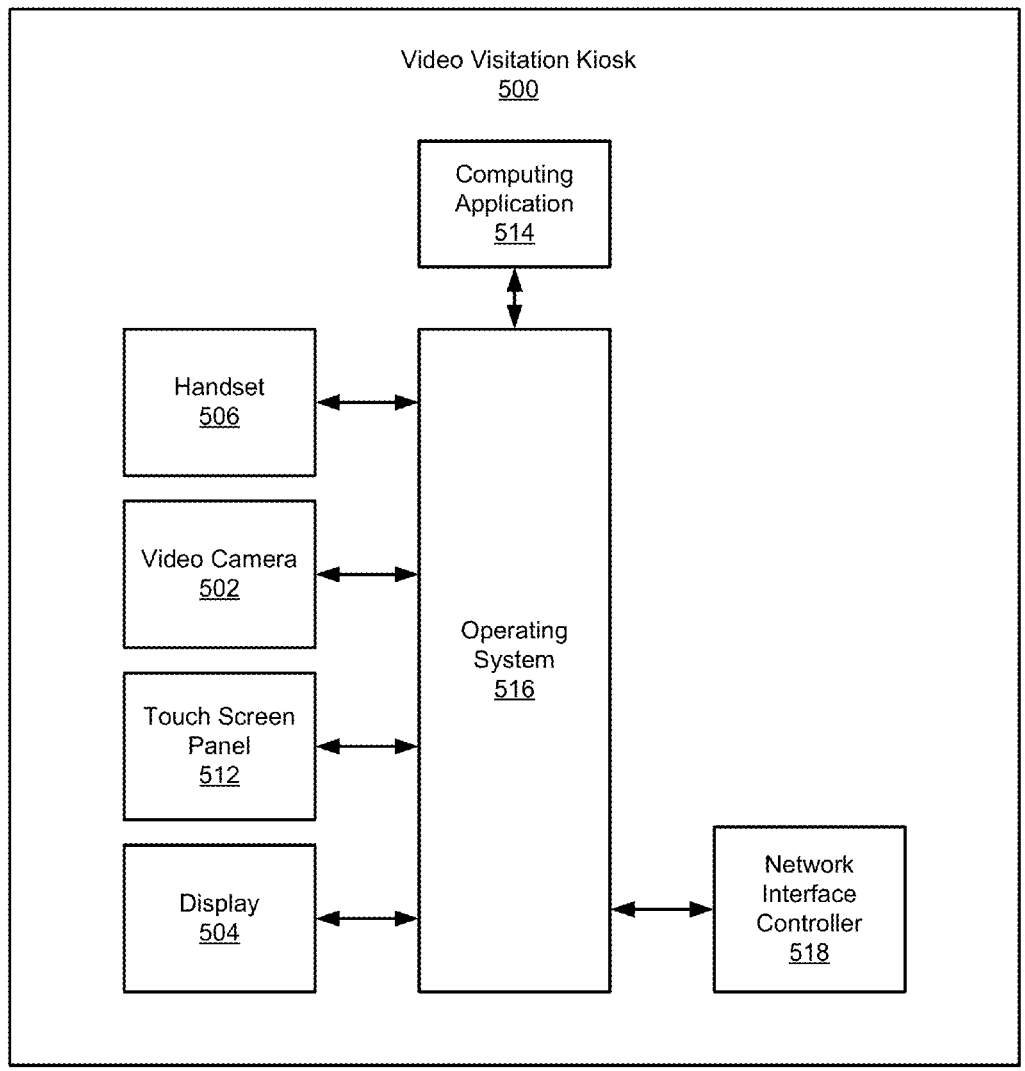

FIG. 5B shows the hardware and software elements of a video visitation kiosk in accordance with one or more embodiments of the invention. The hardware and software elements shown in FIG. 5B may be in addition to the elements described in FIG. 4. As shown in FIG. 5B, the video visitation kiosk (500) includes a handset (506), a video camera (502), a touch screen panel (512), a display (504), a computing application (514), an operating system (516), and a network interface controller (518).

Figure 6:
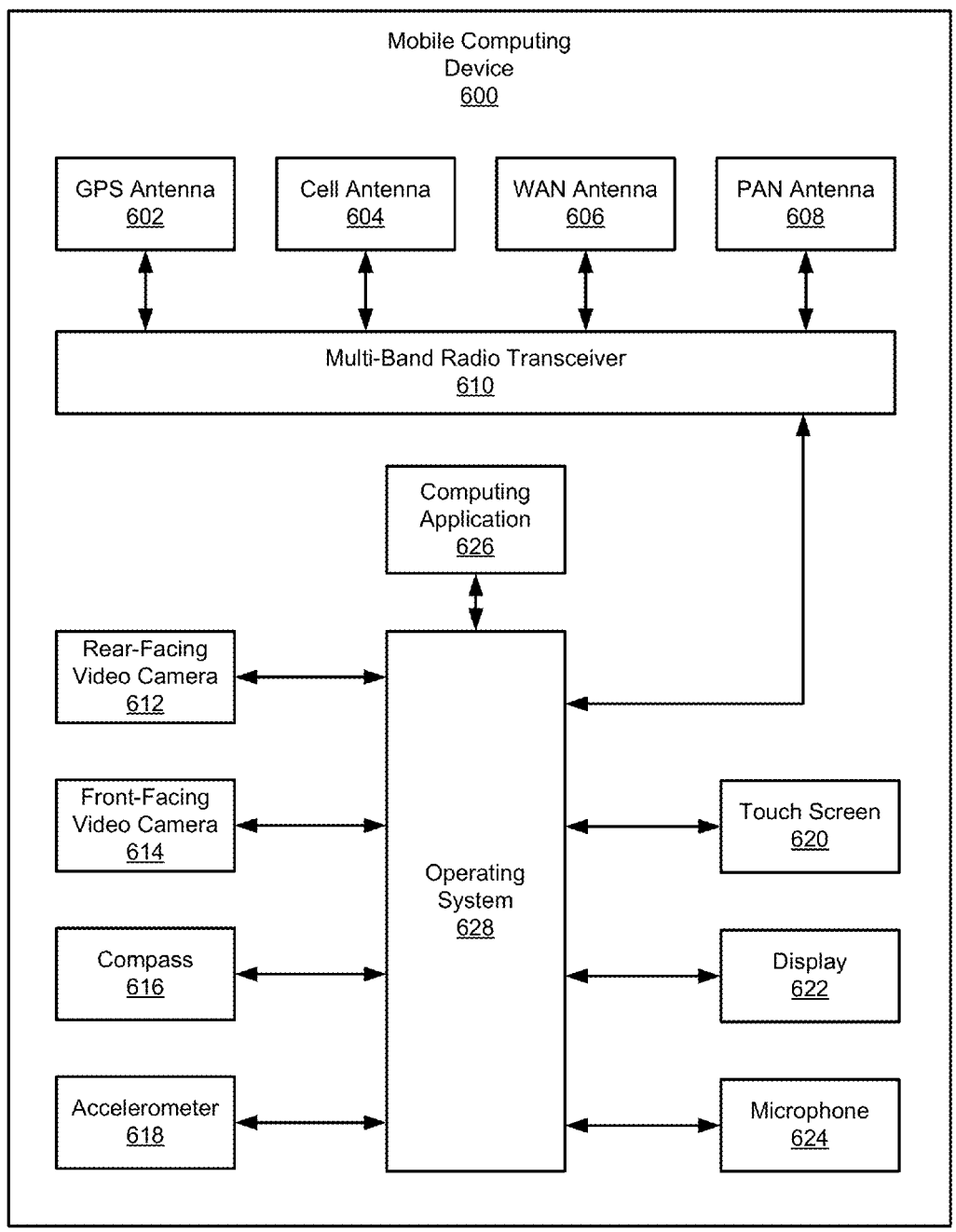

FIG. 6 shows the hardware and software elements of a mobile computing device in accordance with one or more embodiments of the invention. Specifically, the mobile computing device (600) is a type of computing device as described in FIG. 4. The hardware and software elements shown in FIG. 6 may be in addition to the elements described in FIG. 4.

As shown in FIG. 6, the mobile computing device (600) may include a global positioning system (GPS) antenna (602), a cell antenna (604), a wide area network (WAN) antenna (606), and a personal area network (PAN) antenna (608), each connected to a multi-band radio transceiver (610). The mobile computing device (600) also may include a rear-facing video camera (612), a front-facing video camera (614), a compass (616), an accelerometer (618), a touch screen (620), a display (622), and a microphone (624). The mobile computing device (600) also may include a computing application (626) executing on an operating system (628).

Figure 7:
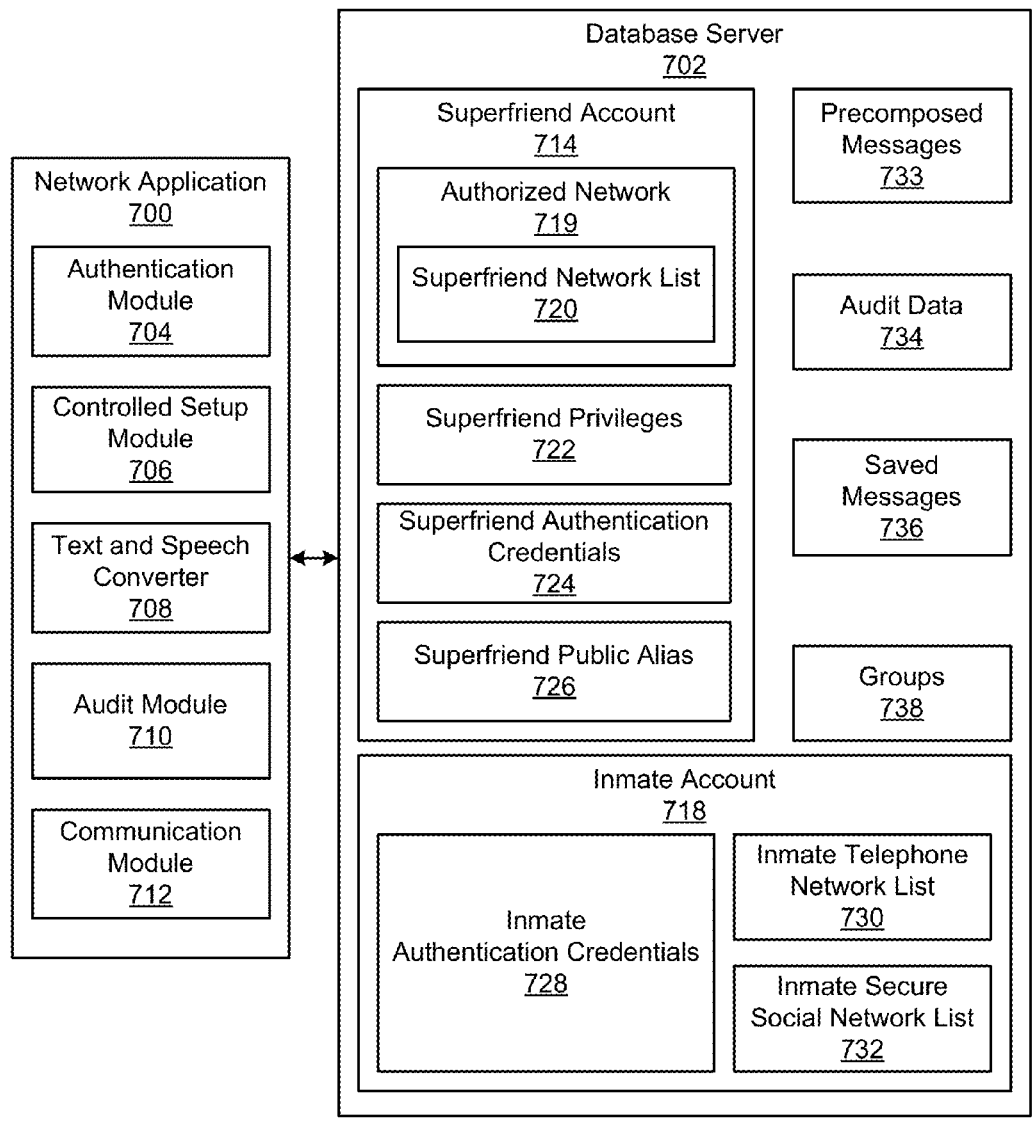

FIG. 7 shows a schematic diagram of a system including a network application (700) and a database server (702). The network application (700) may execute or be a part of application server (118) in FIG. 1. Similarly, the database server may be database server (120) in FIG. 1. Alternative configurations may also be used. For example, either, both, or part of the network application (700) and database server (702) may be located in the controlled facility. The network application (700) and database server (702) are discussed below.

A network application (700) is a software application for connecting inmates and administrators to a network. For example, the network may be a telephone network (not shown) or a secure social network (not shown). The network application (700) may include an authentication module (704), a controlled setup module (706), a text and speech converter (708), an audit module (710), and a communication module (712). Each of these components is discussed below.

An authentication module (704) includes functionality to authenticate individuals to the desired network. For example, the authentication module may include functionality to receive authentication credentials, and determine whether the authentication credentials match stored credentials for the individual. The authentication credentials may be user name, password, voiceprint authentication, face verification information, identifying body marks and features information, retina verification information, palm or fingerprint verification information, or any other type of credential for authentication.

In one or more embodiments of the invention, the controlled setup module (706) includes functionality to create an account (e.g., inmate account (718), superfriend account (714) for an individual. The controlled setup module (706) may further include functionality to populate the account with contacts, and update the account. Populating an inmate account (718) with contacts and updating the inmate account (718) are discussed with reference to FIGS. 8-10.

Continuing with FIG. 7, in one or more embodiments of the invention, the text and speech converter (708) includes functionality to convert textual input into audio output. The text and speech converter (708) may further include functionality to convert audio input to textual output. Further, the text and speech converter (708) may include functionality to convert one audio input into a second audio input. For example, consider the scenario in which an administrator would like to transmit an anonymous message, such as deliver bad news. In such a scenario, the text and speech converter (708) may include functionality to replace an administrator's voice with a computerized audio. For example, the computerized audio may be a computer voice speaking the administrator's spoken words or manipulation of the sounds of the administrator's voice.

In one or more embodiments of the invention, the audit module (710) includes functionality to track communications to and from inmates. Specifically, the audit module (710) includes functionality to track, calculate, and store messages, timestamps defining when the message was transmitted, when the message was received, whether the message was transmitted to audio format, the length of time in which the message was being presented, a unique identifier of the communication device (e.g., inmate kiosk, inmate phone, inmate computing device) used to receive the message, any response to the message, and other tracking information about a message.

The audit module (710) may further include functionality to receive a notification of an investigation of an inmate, search the datacenter server to obtain audit data (734) for the message, and transmit the audit data to an investigator application. For example, the inmate may deny having received a message regarding a court date or assert that the inmate did not read the message. In such an example, the audit module may receive a notification that an investigation is being performed into whether the inmate received the message. Continuing with the example, the audit module may include functionality to search the database server, obtain audit data for the message, and transmit the audit data to the investigator application. Thus, the investigator application may determine when the inmate received the message, how long the message was being presented, whether the message was presented in audio format, and any other information.

In one or more embodiments of the invention, the communication module (706) includes functionality to manage a communication on a network. For example, the communication module (706) may include functionality to identify an individual accessing the network, receive a connection request to connect to a contact, and connect the individual to the contact when the contact is in the individual's network list. The term, list, as used in this application refers to any data structure for storing a collection of contacts. The communication module (706) may further include functionality to connect the individual to all social network contacts via the secure social network. In one or more embodiments of the invention, the communication module (706) may facilitate oversight of an inmate's communication by transmitting all or a portion of the messages to an administrator or reviewer for approval.

The communication module (706) may further include functionality to track the length of time that an inmate is communicating on the selected network and/or a number of messages sent and/or received on the selected network. A payment module (not shown) may include functionality to obtain payment from the inmate or a contact of the inmate and disperse the payment. For example, dispersing the payment may include transmitting at least a portion of the payment to a controlled facility and/or transmitting a portion to a network management entity (e.g., telephone connection company, internet connection company) and/or retaining at least a portion. The payment module may include functionality to debit an inmate's money account or otherwise bill the inmate based on the amount of time, number of messages, or other information.

Continuing with FIG. 7, the network application (700) is operatively connected to the database server (702). The database server (702) includes functionality to store information for the network application (700). For example, the database server (702) may store one or more superfriend accounts (714), an inmate account (718) for each inmate, precomposed messages (733), audit data (734), saved messages (736), and groups (738). Each of the stored data is discussed below.

A superfriend account (714) is an account maintained for an administrator or other individual who is a superfriend of an inmate. A superfriend is a person, typically and administrator, contacts and communications from whom an inmate is not permitted to block, reject, or unfriend in accordance with one or more embodiments of the invention. In one or more embodiments, a superfriend is an administrator in the inmate's network list that has authority over the inmate. For example, the superfriend may be a warden, guard, parole officer, counselor, doctor, investigator, or other individual. In some embodiments, a superfriend is an administrator employed by the communications system's developer/operator. For example, the superfriend may be a helpdesk support person, a marketing promotions person, or other individual. In one or more embodiments of the invention, a superfriend has superfriend privileges (722) over an inmate account (718) and has removal protection from the inmate account (718). In one or more embodiments of the invention, superfriend privileges may correspond to administrative privileges. In one or more embodiments of the invention, superfriend privileges (722) include being able to transmit any information to an inmate and having the transmission on the conspicuously placed or presented when the inmate accesses the network. Further, superfriend privileges (722) may include privilege to review all correspondence to and from the inmate. Additional superfriend privileges may exist without departing from the scope of the invention. In one or more embodiments of the invention, an inmate cannot limit the superfriend privileges. In another embodiment, superfriend privileges may be granted to any of the above types of individuals' named accounts. Granting superfriend privileges may be performed in a case in which the type of individual is expected to maintain a personal relationship with an inmate, such as in the case of a doctor or counselor. Such individual may have no overt authority over the inmate, such that protecting said individual's identity is of less concern than, for example, a facility administrator capable of handing down punishment.

In one or more embodiments of the invention, superfriends are given superfriend privileges on a hierarchical basis according to the power of the domain scope of the individual with the superfriend account. For example, a superfriend of the system operator may be able to send messages to all inmates at all facilities using the service while a state director of a department of corrections (DOC) may be able to send messages to all inmates at any and all facilities in which the state director is responsible, even without the permission of the warden superfriend at each facility. Hierarchies may exist at a geographic level, such as state, then county, then facility, then wing of a facility, with a superfriend at each level of hierarchy being able to send messages to all inmates within that domain.

In one or more embodiments of the invention, a superfriend may choose to restrict the scope of the messages that the superfriend sends on a non-geographic basis. For example, a doctor may have a domain that includes all patients he has or is treating, or all of those inmates which are permitted to seek treatment from him. Normally, this doctor would send messages to all of his patients. However, he may choose to further restrict the delivery of messages on the basis of other attributes, such as, for example, sending a message to every inmate at his facility with a peanut food allergy, warning them that today's salad contains peanuts. By way of another example, the doctor may send a message to all inmates diagnosed with hepatitis C, informing them of a new medicine or treatment available.

The superfriend domain privileges or authorized network may be limited by the superfriend or the superfriend's superiors on the basis of gender, age, race, crime, medical condition, physical attributes, geophysical locations, events they've done, inappropriate comments made in the social network, or any other foreseeable attribute or reason.

In one or more embodiments of the invention, superfriends may delegate their privileges to a subordinate. In the above example, the doctor may give his nurse the job of sending such messages, and grant this nurse superfriend privileges sufficient to carry out his instructions. In one or more embodiments of the invention, the delegated privileges do not exceed the superfriend's privileges.

In one or more embodiments of the invention, superfriends may choose to limit the scope of the superfriends authority for specified or all messages sent, but may not expand the scope of their authority outside of the superfriend's permitted domain.

In one or more embodiments of the invention, superfriends may have unilateral power to block inmates, without blocking the superfriend's ability to send message to blocked inmates. For example, if a particular inmate sends abusive or threatening messages to a particular superfriend, the superfriend may block that inmate from sending any messages to that superfriend's account, yet that superfriend will still be able to send messages to that inmate.

In addition to receiving audit data defining which inmates have read the superfriend's messages, the superfriend may choose to embed a test of sorts within each message, to determine if the inmate actually read and comprehended the message, or merely allowed it to be displayed. Such test may take the form of a survey, for example.

Removal protection refers to an inability for an inmate to unfriend the superfriend. Specifically, without proper authority, which an inmate does not have, the superfriend cannot be disassociated from the inmate's network.

In one or more embodiments of the invention, the superfriend account (714) further includes an authorized network (719), superfriend authentication credentials (724), and at least one superfriend public alias.

The authorized network (719) includes a list of inmates with whom a superfriend has permission to have in the superfriend network list (720). In one or more embodiments of the invention, the authorized network (719) may be defined by a collection of is based on inmate attributes of the inmates. An inmate attribute is an attribute about the inmate with respect to being in the controlled facility. For example, the inmate attribute may be a controlled facility identifier, a reason for being in the controlled facility (e.g., crime the inmate committed, class of crimes that the inmate committed, drugs to which the inmate is addicted, and other reasons), history of the inmate in controlled facility, gang relations of the inmate, health issues of the inmate that need to be managed by the controlled facility, and/or other attributes of the inmate. By way of an example, the authorized network (719) may include all inmates in the controlled facility, all inmates in a collection of the controlled facility, inmates with particular health considerations, inmates who are in counseling, or based on other inmate attributes. In one or more embodiments of the invention, in addition to inmates, the authorized network may further include administrators.

The authorized network (719) includes a superfriend network list (720) in one or more embodiments of the invention. In one or more embodiments of the invention, the superfriend network list (720) may be a subset or the entire set of the authorized network (719). The superfriend network list (720) includes a list of contacts with whom the superfriend may communicate. Specifically, the superfriend network list (720) may be a collection of contacts with whom the superfriend is connected. A contact refers to an individual or group of individuals with whom a person is connected. For example, the contact may include a network identifier of an individual and connection information for connecting to the individual. In the case of a superfriend, the contact may include inmates and, optionally, administrators.

In one or more embodiments of the invention, superfriend authentication credentials (724) are authentication credentials used for authenticating the administrator. The superfriend authentication credentials (724) may include user name, password, voiceprint authentication, face verification information, identifying body marks and features information, retina verification information, palm or fingerprint verification information, or any other type of credential for authentication.

In one or more embodiments of the invention, a superfriend public alias (726) is an alternative identifier for the administrator that is presented as the sender and/or recipient of messages. For example, if the administrator is transmitting a message anonymously, the anonymous communication may be under the public alias. By way of another example, if the administrator is performing a communication for a particular group (e.g., the entire controlled facility, a group of prisons, a counseling group), the administrator may use the public alias of a group name to send and receive messages.

Continuing with the database server (702), an inmate account is an account storing information about an inmate. For example, an inmate account may include inmate authentication credentials (728), an inmate telephone network list (730), and an inmate social network list (732). Additionally, although not shown in FIG. 7, the inmate account may also include administrative information, such as name, birthdate, inmate identifier, reason for the inmate to be in the controlled facility, historical confinement of the inmate, list of inmate's violations of regulations of the controlled facility, gang affiliations, account balance for payment of communications, and other information.

The inmate authentication credentials (728) correspond to authentication credentials for the inmate. For example, the authentication credentials may include user name, password, voiceprint authentication, face verification information, identifying body marks and features information, retina verification information, palm or fingerprint verification information, or any other type of credential for authentication.

The inmate telephone network list (730) corresponds to a list of contacts of the inmate for communication via the telephone network. The inmate secure social network list (732) corresponds to a list of contacts of the inmate for communication via a secure social network. In one or more embodiments of the invention, before being allowed to communicate with the contacts, the contacts must be approved. Further, although an inmate may communicate with contacts in the inmate telephone network list and the inmate secure social network list, the contacts may not be approved in accordance with one or more embodiments of the invention. Specifically, the inmate telephone network list and the inmate secure social network list may include unprocessed contacts, filtered contacts, and/or approved contacts.

An unprocessed contact is a contact that has not been vetted or checked to determine whether communication with the unprocessed contact is prohibited. A filtered contact is a contact that is not outright prohibited for communication. An approved contact is a contact that has been vetted and with whom the inmate may communicate. For example, unprocessed contacts may be filtered to remove contacts that are known gang members, are inmates, are wanted criminals, or have other attributes, which make communication with such contacts outright prohibited. In one or more embodiments of the invention, the filtering process may include comparing the contact with lists of prohibited people. In some embodiments, the remaining contacts after the filtering processed are approved contacts. In alternative embodiments, filtered contacts may have to be vetted (e.g., go through an identification and/or approval process) to be approved contacts. The vetting may include performing background checks on the contact and confirming the identity of the contact. In one or more embodiments of the invention, rules of the controlled facility define whether filtered contacts must be vetted in order for the inmate to communicate with the approved contacts. Whether a contact is an unprocessed contact, filtered contact, or approved contact may be maintained as an attribute defined for the contact in the inmate account.

Although FIG. 7 shows the secure social network list (732) as separate and distinct from the telephone network list (730), the secure social network list (732) may be the same as the telephone network list (730). Further, in one or more embodiments of the invention, the inmate may have a single contact list. Each contact in the single contact list may have a parameter indicating whether the inmate may communicate with the contact via telephone network, secure social network, or both. For example, the parameter may be a set bit and/or connection identifiers (e.g., telephone number, secure social network identifier) for the contact.

Continuing with the discussion regarding the database server (702), the precomposed messages (733) correspond to a set of predefined messages from which a sender may select. For example, precomposed messages may be a message about which schedule the inmate is on for the week, the status of an inmate's debit account, notification of violation of a rule or regulation, or other standard message that may be sent to an inmate.

In one or more embodiments of the invention, audit data (734) includes information stored for auditing purposes. For example, for each message, the audit data may include timestamps defining when the message was transmitted, whether the message was transmitted in audio format, when the message was received, the length of time in which the message was being presented, a unique identifier of the communication device used to receive the message, any response to the message, and other tracking information about a message.

Saved messages (736) correspond to messages that are saved. For example, saved messages may include postings to the inmate secure social network, voicemail messages, one to one messages, multicast or broadcast messages, and other messages.

In one or more embodiments of the invention, groups (738) relate a group identifier to account identifiers of individuals who are members of the group. For example, for a counseling group, the counseling group identifier is related to the counselor superfriend account identifier along with inmates who participate in the counseling session. By way of another example, for a controlled facility group, the controlled facility group identifier may be related to all inmates in the controlled facility. Thus, a communication sent to a group identifier will be broadcasted to all members of the group in one or more embodiments of the invention.

Although FIG. 7 shows a certain configuration of components, other configurations may be used without departing from the scope of the invention. For example, the superfriend account (714) may be located on an application. By way of another example, one or more modules of the network application (700) may be located in a different component of the system.

Figure 8:
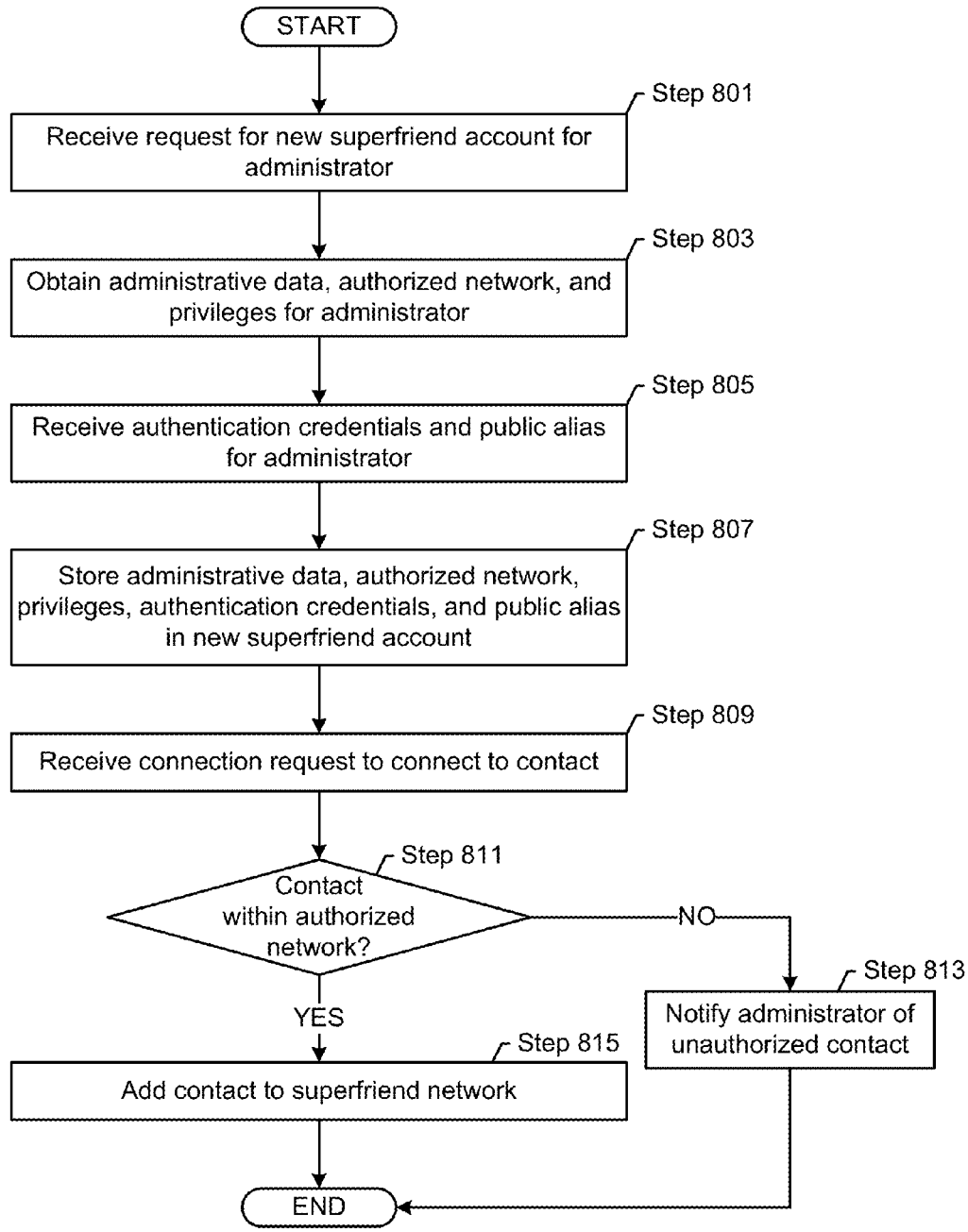
FIGS. 8-10 show flowcharts of a method in one or more embodiments of the invention.
Figure 9:
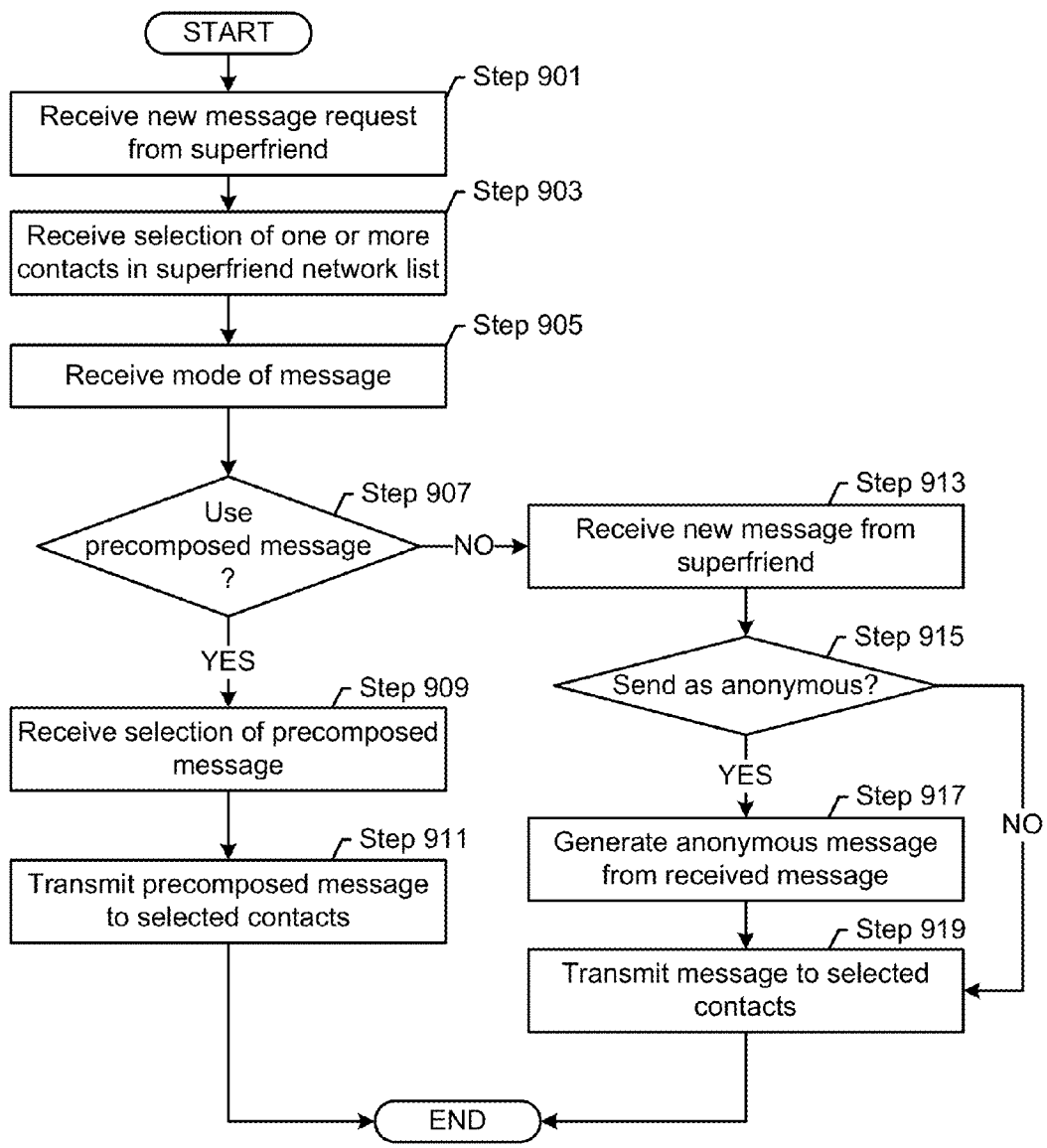
Figure 10:
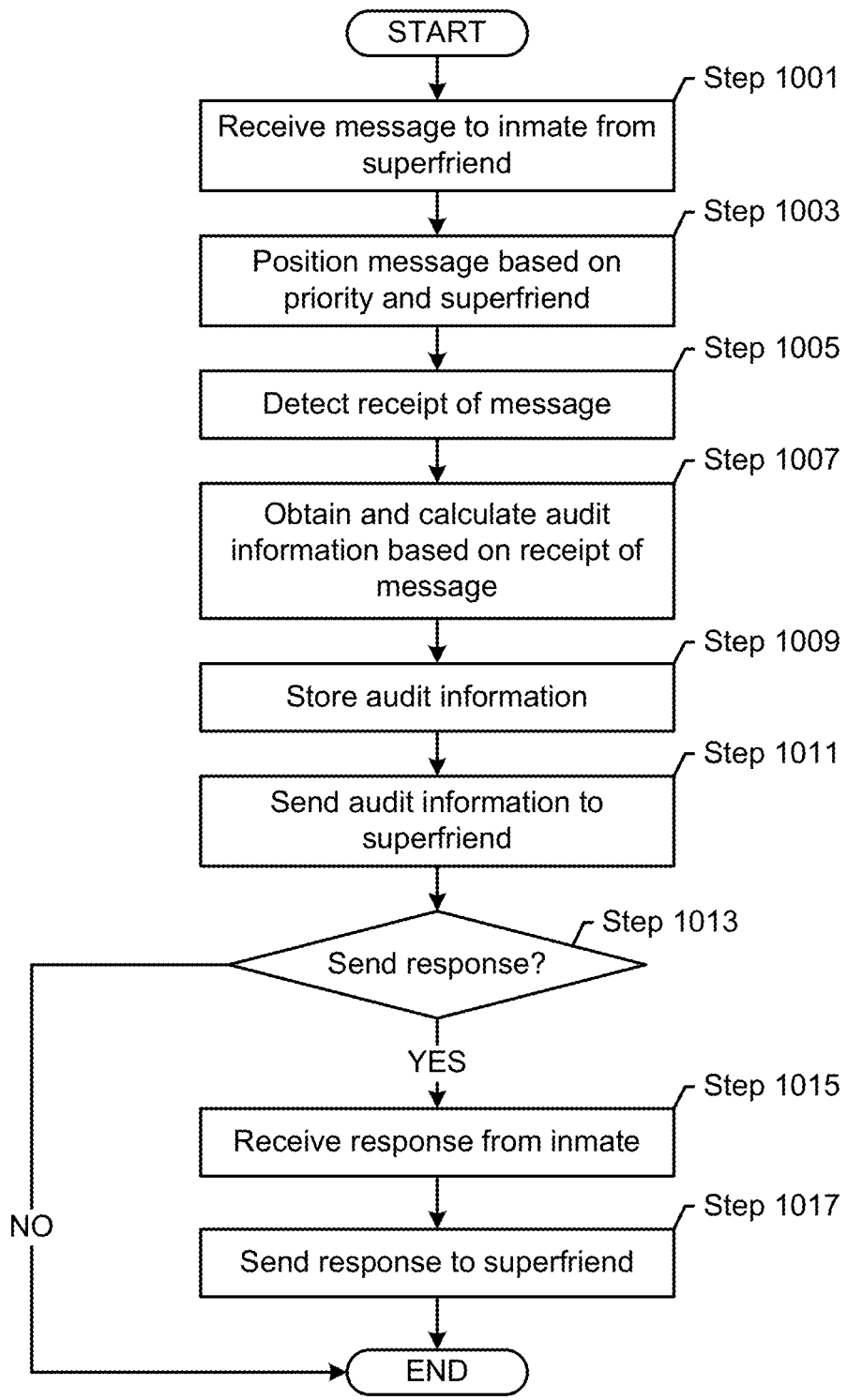

FIGS. 8-10 show flowcharts in one or more embodiments of the invention. While the various steps in these flowcharts are presented and described sequentially, some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 8 shows a flowchart for initializing a superfriend account in one or more embodiments of the invention. In Step 801, a request for a new superfriend account for an administrator is received in one or more embodiments of the invention. For example, the administrator may be a new administrator to the controlled facility.

In Step 803, administrative data, authorized network, and privileges for the administrator are obtained in accordance with one or more embodiments of the invention. Specifically, the administrator, an information technology specialist, and/or other individual may submit the administrator's name, employee identifier, address, phone number, birth date, and other such data to the setup module of the network application. Further, the administrator, an information technology specialist, and/or other individual may submit information defining the administrator's authorized network. The administrator's authorized network may be defined based on the role of the administrator with respect to the controlled facility. For example, a warden may have an authorized network of the entire facility while a physician in the controlled facility may only have an authorized network over all inmates diagnosed with a mental illness. In one or more embodiments of the invention, privileges may be set based on the needs of the administrator in the controlled facility.

In Step 805, authentication credentials and a public alias are received for the administrator in accordance with one or more embodiments of the invention. In one or more embodiments of the invention, the administrator submits the authentication credentials and select a public alias. The selected public alias may be defined based on the employment position of the administrator. For example, a doctor may have an alias of Clinic. A food service manager known as Bob to the inmates may have an alias of Chef Bob. Further, if the administrator is responsible for transmitting bad news occasionally, the administrator may have an alias that does not have anything to do with the administrator specifically. For example, the administrator may have the alias of Controlled Facility.

In Step 807, administrative data, authorized network, privileges, authentication credentials, and public alias are stored in a new superfriend account in accordance with one or more embodiments of the invention. In one or more embodiments of the invention, the new superfriend account is created and the data received is stored.

In Step 809, a connection request is received to connect to a contact in accordance with one or more embodiments of the invention. The connection request may be received when creating the superfriend account, when creating an inmate account, and/or on an as desired basis. For example, the administrator, an information technology specialist, and/or other individual may initially select contacts to add based on an employment position of the administrator. By way of a more concrete example, if the administrator is a doctor of the controlled facility, all inmates that have medical issues may be added to the administrator network list. Further, in one or more embodiments of the invention, when a new inmate is confined in the controlled facility, a connection request may be received to add the new inmate. In one or more embodiments of the invention, the inmates have no control over which administrators are connected to them. Specifically, an inmate does not have any authority to accept or reject a connection with a superfriend or remove a superfriend.

In Step 811, a determination is made whether the contact is in the authorized network in accordance with one or more embodiments of the invention. Specifically, a determination is made whether the contact is approved. If the contact is not in the authorized network, the administrator is notified of the unauthorized contact in Step 813 in accordance with one or more embodiments of the invention. Specifically, the administrator is notified that the administrator cannot connect to the unauthorized contact. Notification that the administrator is attempting to connect to an unapproved contact may be sent to a supervisor of the administrator for evaluation. The supervisor may allow or deny of the connection. Further, denial information may be stored to track the contacts to whom the administrator is attempting to connect. The denial information may be used for investigative purposes to investigate whether the administrator is performing or attempting to perform improper communication with inmates.

In Step 815, if the contact is part of the authorized network, the contact is added to the superfriend network in accordance with one or more embodiments of the invention. Specifically, the contact is added to the superfriend network list. In one or more embodiments of the invention, once added, the administrator may send messages to the contact.

Although not shown in FIG. 8, rather than performing Steps 809-815, all contacts in the superfriend's authorized network may be automatically added to the superfriend network list. In such a scenario, one or more of Steps 809-815 may be omitted without departing from the scope of the invention.

FIG. 9 shows a flowchart for a superfriend to send a message to one or more contacts in accordance with one or more embodiments of the invention. In Step 901, a new message request is received from the superfriend in one or more embodiments of the invention. The new message request may be received via a computer interface or via a telephone interface. Prior to or as a part of receiving the new message request, the administrator may authenticate him or herself to the network application. The authentication attempt and whether the authentication was successful may be stored for tracking purposes. Further, the administrator may select to compose a new message.

In Step 903, a selection of one or more contacts in the superfriend network is received. For example, the superfriend may request to send the message to all contacts, a particular group of contacts, to a subset of contacts, etc. In one or more embodiments of the invention, the superfriend may select the subset using inmate attributes.

In Step 905, the mode of the message is received in accordance with one or more embodiments of the invention. In one or more embodiments, the administrator selects the mode by which the contacts will receive the message. The administrator may select the mode on a per contact basis. For example, if the administrator knows that a particular inmate cannot read, the administrator may select that the particular inmate receive the message in audio format (e.g., via telephone or played on the inmate kiosk or computing device) while the remaining inmates receive a textual format of the message.

In Step 907, a determination may be made whether to use a precomposed message in accordance with one or more embodiments of the invention. For example, the communication module of the network application may present an option to use a precomposed message. For example, the superfriend may decide to use the precomposed message when the message is a standard message or when the superfriend would like to be completely anonymous when transmitting the message.

If a determination is made to use a precomposed message, then a selection of the precomposed message is received in Step 909. For example, the communication module may present the administrator with a series of optional precomposed messages. The presentation may be via a graphical user interface of an administrator computer system or kiosk or via an auditory list accessed via telephone. From the list of options, the administrator may select the desired precomposed message.

In Step 911, the precomposed message is transmitted to selected contacts in accordance with one or more embodiments of the invention. The precomposed message is transmitted in accordance with the selected mode for sending to each contact. For example, for contacts that are to receive messages via inmate telephone, precomposed message is added to the contacts inbox. Further, the contacts are notified that a new message exists. For example, a guard may notify an inmate that the inmate has a new message. Alternatively, the inmate may periodically check for new messages. By way of another example, for contacts that receive messages via the inmate kiosk or inmate computing device, when an inmate authenticates him or herself to the inmate computing device, the inmate may be notified of the new message. Although not shown in FIG. 9, a precomposed message may be sent anonymously by using an anonymous public alias of the superfriend.

Returning to Step 907 of FIG. 9, if a determination is made not to use the precomposed message, then a new message is received from the superfriend in Step 913 in accordance with one or more embodiments of the invention. For example, the superfriend may dictate the message for speech to text conversion, the superfriend may speak the message, the superfriend may type the message, or perform any other action for transmitting the new message.

In Step 915, a determination is made whether to send the message anonymously. For example, the superfriend may select an option to send message as anonymous. The superfriend may select such an option in order to avoid bodily retribution from the inmates.

If a determination is made to send the message anonymously, then in Step 917, an anonymous message is generated from the received new message in accordance with one or more embodiments of the invention. Various techniques may be used to generate the anonymous message. For example, generating the anonymous message may include performing a first conversion of the superfriend's voice auditory message to a text message and then performing a second conversion of the text message to an auditory format read by a generic computer voice. By way of another example, direct voice alteration of the superfriend's voice in an auditory message may be performed. Additionally or alternatively, an alias of the superfriend may be used as the sender of the message to transform the message to an anonymous message.

In Step 919, the message is transmitted to selected contacts. Transmitting the message may be performed similar to transmitting the precomposed message.

FIG. 10 shows a flowchart for an inmate to receive a message in accordance with one or more embodiments of the invention. In Step 1001, a message to an inmate is received from a superfriend. For example, the inmate's inbox may receive a new message. Although not shown in FIG. 1, the inmate may authenticate him or herself to the telephone network, the inmate kiosk, or the inmate computing device. The authentication assures that any messages from superfriends are actually being received by the inmate.

In Step 1003, the message is positioned based on priority and the superfriend in accordance with one or more embodiments of the invention. In one or more embodiments of the invention, for any message from a superfriend, the message is conspicuously placed. For example, if the inmate is accessing the message via an inmate telephone, then any message from one or more superfriends are played prior to any message from any other contact. Further, the inmate may be prohibited from making a telephone call until after such messages are played to the inmate. By way of another example, if the inmate is accessing the message via an inmate kiosk or inmate computer system, any messages from superfriends are conspicuously placed. In the example, the message(s) may be placed on a separate window that is displayed prior to any window displaying other messages from non-superfriends. Alternatively or additionally, the messages may be placed in the same window as other messages, but prior to other messages. Further, the inmate may be prohibited from sending messages or viewing other messages until after all and entire messages from superfriends are presented to the inmate.

In one or more embodiments of the invention, messages from superfriends may be ordered according to priority. For example, messages that relate to an inmate's court date may be set and displayed prior to a message that corresponds to an inmate survey. By way of another example, messages involving a violation of a rule or regulation of the controlled facility may be placed at a higher priority than a message from a guidance counselor.

In Step 1005, receipt of the message is detected in one or more embodiments of the invention. Specifically, when the message is presented, the system detects that the inmate has received the message.

In one or more embodiments of the invention, the inmate may control the mode in which the message is transmitted. For example, for textual messages, the inmate may select to have an audio version of the message played for the message. For audio messages, the inmate may select to have a textual version of the message displayed for the inmate. The speech and text converter may perform the desired conversion in accordance with one or more embodiments of the invention.

In Step 1007, audit information is obtained and calculated based on the receipt of the message. In one or more embodiments of the invention, obtaining and calculating the audit information may include obtaining a starting timestamp indicating when the presentation of the message started, obtaining an ending timestamp indicating when presentation of the message ended, and calculating a difference to obtain a length of time in which the message was presented. Additionally, a unique identifier of the device (e.g., inmate computing device, inmate kiosk, inmate telephone) used to receive the message may be obtained. Additional audit information may include information about the superfriend sending the message, and the mode (e.g., audio, textual) used to present the message.

In Step 1009, the audit information is stored in accordance with one or more embodiments of the invention. In one or more embodiments of the invention, the audit information may be stored in a secured datacenter system. The message, as well as any other message or response transmitted to and from the inmate, may be stored with the audit information. Multiple copies of the audit information may be stored on different physical devices to ensure the audit information is maintained.

By maintaining audit information and messages, embodiments provide a mechanism for tracking messages for investigative purposes. For example, if an inmate denies having received a message, such as a court date, the datacenter may be accessed to obtain audit information corresponding to the message of the court date. Specifically, a query may be performed on the datacenter to search and recover all messages to the inmate regarding a court date. The corresponding audit information for each message returned in the query may be obtained. The corresponding audit information and the message may be transmitted to an investigator to prove that the inmate did receive the message or did not receive the message.

By way of another example, the use of the audit information and message may be used to show that the inmate is in the process of committing perjury to the court or committing a crime while in the controlled facility. For example, the messages to and from inmates may be periodically reviewed and analyzed to determine whether the message includes information about a crime or inconsistent statements made in court. If a message is found, the message may be sent to an investigator with audit information proving that the inmate did in fact receive or transmit the message.

In Step 1011, the audit information is transmitted to the superfriend in accordance with one or more embodiments of the invention. By transmitting the audit information to the superfriend, the superfriend is assured that the message was received.

In Step 1013, a determination is made whether to send a response. For example, the inmate may desire to send a response message to the superfriend. If a determination is made to send the response, the response from the inmate may be received in Step 1015. For example, the response may be received via the same device used to present the message. The received response may be parsed and analyzed for vulgar or aggressive words. If vulgar or aggressive words are used, the response may be sent to a reviewer. In Step 1017, the response is sent to the superfriend in accordance with one or more embodiments of the invention. Sending the response to the superfriend may be performed in a same or similar manner to transmitting the message to the inmate.

Figure 11:
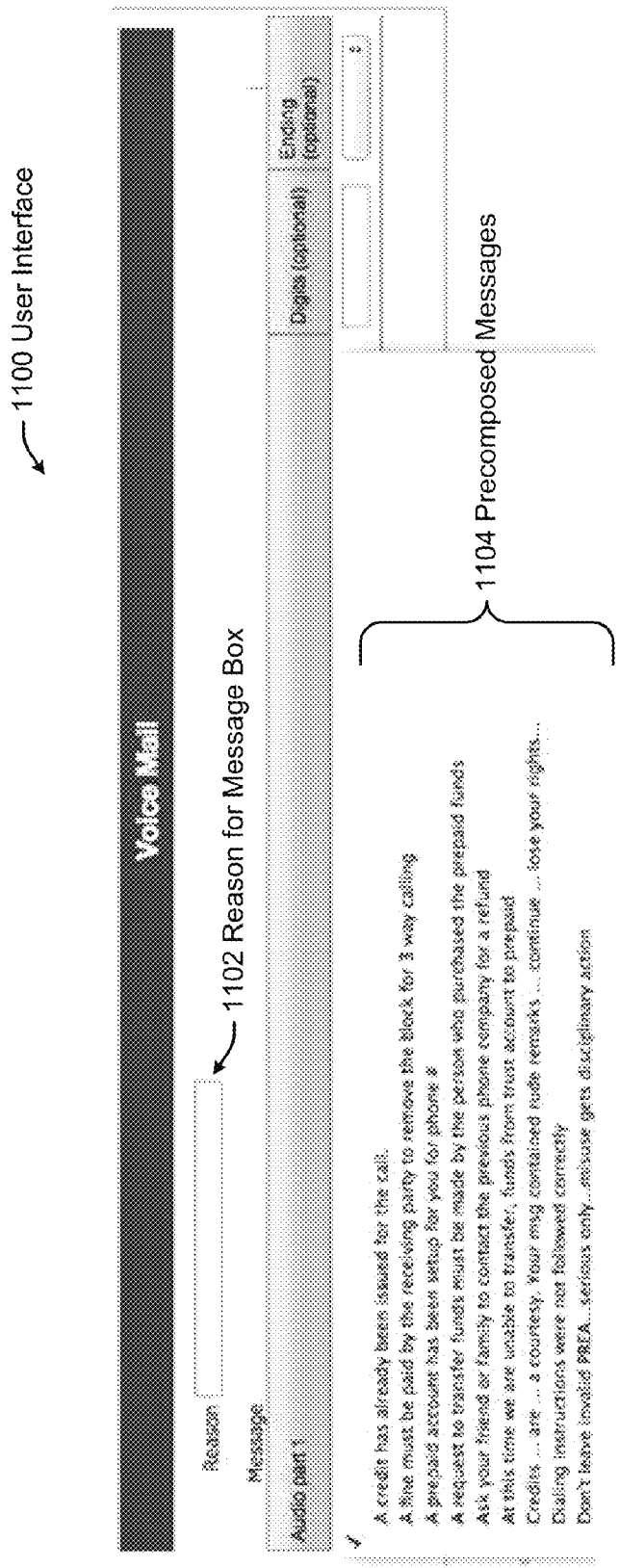
FIG. 11 shows an example in one or more embodiments of the invention.

The following example is for explanatory purposes only and not intended to limit the scope of the invention. FIG. 11 shows an example user interface (1100) for a superfriend to transmit precomposed messages to one or more inmates. As shown in FIG. 11, a superfriend may indicate in box (1102), the reason for the message. The reason may be used for auditing purposes, as a subject line, to define priority, for another reason, or combination thereof. Further, the superfriend may select from a set of precomposed messages (1104). For example, if the inmate is having difficulty using the inmate telephone, the precomposed message (1104) may be that fine must be paid or that a request to transfer funds must be made in order to allow use of the phone. As shown in the example, the precomposed message (1104) may be transmitted to an inmate's voicemail inbox. Thus, the inmate may receive a notice from a guard that he or she has a new message and check his or her voicemail via the inmate telephone to receive the new message.

By way of another example, a warden of the controlled facility may authenticate himself using a "Warden" superfriend account that may allow him to communicate with and access the wall posts of anyone in his facility. The warden may post a message to each pod (i.e., separate collection of inmates) announcing that pod's meal schedules for the week and what will be served for the detainees in that pod, along with a survey that will be used to help determine foods that will be served the following week. Next, the warden may send a message to all inmates who are HIV positive, notifying them that medication distribution has been delayed by fifteen minutes. Further, the warden may respond to an inmate who has asked him a specific question. Last, the warden may send a pre-recorded welcome and rules video to all inmates booked within the last twenty-four hours. In the example, audit information for each of the messages may be stored. Thus, inmates who are HIV positive cannot deny that they have received the message. Further, in one or more embodiments of the invention, as a superfriend the warden's messages are conspicuously presented to the inmates. Priority amongst the messages may be set, such that the survey is given lowest priority and the HIV message is given the highest priority.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for message transmission in a controlled facility, comprising:
   receiving a request to transmit a message from a superfriend in a controlled facility, wherein the superfriend has an administrative privilege and a removal protection, wherein the removal protection prevents each inmate of a plurality of inmates from disassociating the superfriend from an inmate network of the inmate, wherein each inmate of the plurality of inmates has permission to associate and disassociate, in the inmate network, with other inmates of the plurality of inmates and not the superfriend;
   receiving, for the message from a superfriend network list of the superfriend, a selection of the plurality of inmates confined in the controlled facility;

sending, via an electronic network, the message to each inmate of the plurality of inmates in the controlled facility;

presenting the message to each inmate of the plurality of inmates in the controlled facility when the inmate accesses the electronic network; and for each inmate of the plurality of inmates:
calculating audit information capturing the presenting of the message, wherein the presenting of the message includes requiring each inmate to access the message prior to gaining access to other messages from non-superfriends;
transmitting an acknowledgement of receipt of the message to the superfriend; and
storing the audit information,
wherein for at least one inmate of the plurality of inmates, calculating the audit information comprises calculating a length of time in which the message is presented to the inmate, and
wherein the audit information comprising the length of time.

2. The method of claim 1, further comprising:
receiving a notice of an investigation of an inmate of the plurality of inmates of the controlled facility; and
transmitting the audit information captured for the inmate to an investigator for the investigation of the inmate.

3. The method of claim 1, wherein receiving the request to transmit the message is anonymous and comprises:
generating an anonymous message from a new message, wherein the anonymous message is sent to each of the plurality of inmates.

4. The method of claim 3, wherein generating the anonymous message comprises:
performing a speech to text conversion on the new message to obtain a textual message; and
performing a text to speech conversion on the textual message to obtain a computer voice message, wherein the computer voice message is an anonymous message.

5. The method of claim 3, wherein generating the anonymous message comprises:
obtain a public alias of the superfriend; and
sending the message using the public alias of the superfriend.

6. The method of claim 1, wherein the selection of the plurality of inmates is received by presenting the superfriend with a plurality of groups and receiving a selection of a group from the plurality of groups, wherein the group comprises the plurality of inmates.

7. The method of claim 1, further comprising:
generating the plurality of groups based on inmate attributes of a plurality of inmates.

8. A system for message transmission in a controlled facility, comprising:
a computer processor;
a memory;
a database server comprising a superfriend account for a superfriend, wherein the superfriend account stores a superfriend network list, wherein the superfriend comprises an administrative privilege and a removal protection, wherein the removal protection prevents each inmate of a plurality of inmates from disassociating the superfriend from an inmate network of the inmate, wherein each inmate of the plurality of inmates has permission to associate and disassociate, in the inmate network, with other inmates of the plurality of inmates and not the superfriend; and a network application executing on the computer processor and comprising instructions that:
receive a request to transmit a message from the superfriend in a controlled facility,
receive, for the message from the superfriend network list of the superfriend, a selection of the plurality of inmates confined in the controlled facility,
send, via an electronic network, the message to each of the plurality of inmates in the controlled facility, and
present the message to each inmate of the plurality of inmates in the controlled facility when the inmate accesses the electronic network, wherein the message is presented in a separate window that is displayed prior to any window displaying other messages from non-superfriends, and for each inmate of the plurality of inmates:
calculate audit information capturing the presenting of the message;
transmit an acknowledgement of receipt of the message to the superfriend; and
storing the audit information,
wherein for at least one inmate of the plurality of inmates, calculating the audit information comprises calculating a length of time in which the message is presented to the inmate, and
wherein the audit information comprising the length of time.

9. The system of claim 8, wherein the instructions further:
receive a notice of an investigation of an inmate of the plurality of inmates of the controlled facility, and
transmit the audit information to an investigator application, and
wherein the system further comprises an investigator application configured to present the audit information captured for the inmate to an investigator for the investigation of the inmate.

10. The system of claim 8,
wherein receiving the request to transmit the message is anonymous and comprises generating an anonymous message from a new message, and
wherein the anonymous message is sent to each of the plurality of inmates.

11. The system of claim 10,
wherein the instructions further:
perform a speech to text conversion on the new message to obtain a textual message, and
perform a text to speech conversion on the textual message to obtain a computer voice message, wherein the computer voice message is an anonymous message, and
wherein generating the anonymous message comprises sending the message to the text to speech converter.

12. The system of claim 10, wherein the superfriend account further stores a public alias of the superfriend, and wherein generating the anonymous message comprises:
obtain the public alias of the superfriend from the superfriend account; and
sending the message using the public alias of the superfriend.

13. The system of claim 10, wherein the database server comprises a plurality of groups generated based on inmate attributes of the plurality of inmates, and wherein selection of the plurality of inmates is received by presenting the superfriend with the plurality of groups and receiving a selection of a group from the plurality of groups, wherein the group comprises the plurality of inmates.

14. A non-transitory computer readable medium for message transmission in a controlled facility, the non-transitory computer readable medium comprising computer readable program code for:
  receiving a request to transmit a message from a superfriend in a controlled facility, wherein the superfriend comprises an administrative privilege and a removal protection, wherein the removal protection prevents each inmate of a plurality of inmates from disassociating the superfriend from an inmate network of the inmate, wherein each inmate of the plurality of inmates has permission to associate and disassociate, in the inmate network, with other inmates of the plurality of inmates and not the superfriend;
  receiving, for the message from a superfriend network list of the superfriend, a selection of the plurality of inmates confined in the controlled facility;
  sending, via an electronic network, the message to each inmate of the plurality of inmates in the controlled facility;
  presenting the message to each inmate of the plurality of inmates in the controlled facility when the inmate accesses the electronic network; and
  for each inmate of the plurality of inmates:
    calculating audit information capturing the presenting of the message, wherein the presenting of the message includes requiring each inmate to access the message prior to gaining access to other messages from non-superfriends;
    transmitting an acknowledgement of receipt of the message to the superfriend; and
    storing the audit information,
    wherein for at least one inmate of the plurality of inmates, calculating the audit information comprises calculating a length of time in which the message is presented to the inmate, and
    wherein the audit information comprising the length of time.

15. The non-transitory computer readable medium of claim 14, further comprising computer readable program code for:
  receiving a notice of an investigation of an inmate of the plurality of inmates of the controlled facility; and
  transmitting the audit information captured for the inmate to an investigator for the investigation of the inmate.

16. The non-transitory computer readable medium of claim 14,
  wherein receiving the request to transmit the message is anonymous and comprises generating an anonymous message from a new message, and
  wherein the anonymous message is sent to each inmate of the plurality of inmates.

17. The non-transitory computer readable medium of claim 16, wherein generating the anonymous message comprises:
  performing a speech to text conversion on the new message to obtain a textual message; and
  performing a text to speech conversion on the textual message to obtain a computer voice message, wherein the computer voice message is an anonymous message.

18. The non-transitory computer readable medium of claim 16, wherein generating the anonymous message comprises:
  obtain a public alias of the superfriend; and
  sending the message using the public alias of the superfriend.

19. The non-transitory computer readable medium of claim 14, wherein the selection of the plurality of inmates is received by presenting the superfriend with a plurality of groups and receiving a selection of a group from the plurality of groups, wherein the group comprises the plurality of inmates.

20. The non-transitory computer readable medium of claim 14, further comprising computer readable program code for:
  generating the plurality of groups based on inmate attributes of the plurality of inmates.

* * * * *